United States Patent
Sagemueller et al.

(10) Patent No.: US 10,502,564 B2
(45) Date of Patent: Dec. 10, 2019

(54) METHOD FOR DETERMINING A TORQUE ACTING ON A ROTATIONAL DEVICE OR A FORCE ACTING ON A ROTATIONAL DEVICE

(71) Applicant: CARL ZEISS INDUSTRIELLE MESSTECHNIK GMBH, Oberkochen (DE)

(72) Inventors: Rainer Sagemueller, Aalen (DE); Dominik Seitz, Schwaebisch Gmuend (DE)

(73) Assignee: CARL ZEISS INDUSTRIELLE MESSTECHNIK GMBH, Oberkochen (DE)

( * ) Notice: Subject to any disclaimer, the term of this patent is extended or adjusted under 35 U.S.C. 154(b) by 125 days.

(21) Appl. No.: 15/658,963

(22) Filed: Jul. 25, 2017

(65) Prior Publication Data

US 2017/0322022 A1    Nov. 9, 2017

Related U.S. Application Data

(63) Continuation of application No. PCT/EP2016/051742, filed on Jan. 28, 2016.

(30) Foreign Application Priority Data

Jan. 29, 2015   (DE) ........................ 10 2015 201 583

(51) Int. Cl.
   *G01B 21/04*  (2006.01)
   *G01M 13/04*  (2019.01)
   (Continued)

(52) U.S. Cl.
   CPC .......... *G01B 21/045* (2013.01); *G01L 5/0009* (2013.01); *G01M 3/04* (2013.01); *G01M 13/04* (2013.01)

(58) Field of Classification Search
   None
   See application file for complete search history.

(56) References Cited

U.S. PATENT DOCUMENTS

| 6,741,419 B2 | 5/2004 | Wauke |
| 7,357,041 B2 | 4/2008 | Morishita |
| (Continued) | | |

FOREIGN PATENT DOCUMENTS

| CN | 1402237 A | 3/2003 |
| CN | 1910459 A | 2/2007 |
| (Continued) | | |

OTHER PUBLICATIONS

International Search Report for PCT/EP2016/051742; dated Apr. 25, 2016; 3 pp.

(Continued)

*Primary Examiner* — Daniel S Larkin
(74) *Attorney, Agent, or Firm* — Harness, Dickey & Pierce, P.L.C.

(57) ABSTRACT

A method for determining a force acting on a rotational device transverse to an axis of rotation of a rotor of the rotational device. The rotational device has a measuring system comprising a measurement body and detection devices for detecting a relative position of the detection device and the measurement body. The method comprises the following steps: producing a force which acts on the rotational device transverse to the axis of rotation of the rotor in a set rotational position, wherein the force causes a deflection of the rotor; determining the deflection of the rotor and/or a position error of the rotor in the set rotational position of the rotor from the relative position of the detection devices and the measurement body; and determining the force in the set rotational position of the rotor using (Continued)

a predetermined relationship between the force and the deflection and/or position error.

9 Claims, 11 Drawing Sheets

(51) Int. Cl.
*G01L 5/00* (2006.01)
*G01M 3/04* (2006.01)

(56) References Cited

U.S. PATENT DOCUMENTS

| | | |
|---|---|---|
| 7,634,955 B2 | 12/2009 | Osaki et al. |
| 9,212,888 B2 | 12/2015 | Merlo |
| 9,671,257 B2 | 6/2017 | Held et al. |
| 2004/0025357 A1 | 2/2004 | Schroder |
| 2007/0051179 A1 | 3/2007 | McMurtry et al. |
| 2010/0039656 A1 | 2/2010 | Lippuner et al. |
| 2010/0286941 A1 | 11/2010 | Merlot |
| 2014/0167745 A1 | 6/2014 | Held et al. |
| 2014/0236520 A1 | 8/2014 | Engel et al. |
| 2017/0234681 A1 | 8/2017 | Held et al. |

FOREIGN PATENT DOCUMENTS

| | | |
|---|---|---|
| CN | 101190498 A | 6/2008 |
| CN | 101896790 A | 11/2010 |
| CN | 103782130 A | 5/2014 |
| CN | 103827637 A | 5/2014 |
| DE | 10127528 A1 | 3/2002 |
| DE | 102005023467 A1 | 11/2006 |
| DE | 10 2008 058 198 A1 | 5/2010 |
| EP | 0325924 A1 | 8/1989 |
| EP | 1944582 A1 | 7/2008 |
| EP | 2 171 394 | 4/2010 |
| EP | 1687589 B1 | 9/2012 |
| JP | S61153040 A | 7/1986 |
| JP | H06313450 A | 11/1994 |
| WO | 2009/013769 A1 | 1/2009 |
| WO | 2013/007285 A1 | 1/2013 |
| WO | 2013/007286 A1 | 1/2013 |
| WO | WO-2014054507 A1 | 4/2014 |
| WO | 2014/108187 A1 | 7/2014 |

OTHER PUBLICATIONS

English translation of International Preliminary Report on Patentability; dated Aug. 9, 2017; 9 pp.

METHOD FOR DETERMINING A TORQUE ACTING ON A ROTATIONAL DEVICE OR A FORCE ACTING ON A ROTATIONAL DEVICE

CROSS-REFERENCES TO RELATED APPLICATIONS

This application is a continuation of international patent application PCT/EP2016/051742, filed on Jan. 28, 2016 designating the U.S., which international patent application has been published in German and claims priority from German patent application DE 10 2015 201 583.1, filed on Jan. 29, 2015. The entire contents of these prior applications are incorporated herein by reference.

BACKGROUND OF THE INVENTION

The present invention relates to a method for ascertaining a torque and/or a force, which acts on a rotary apparatus, in particular a rotary apparatus of a coordinate measuring machine (CMM), and which is directed across an axis of rotation of a rotor of the rotary apparatus, and to a method for ascertaining a phase angle of the center of gravity of a mass on a rotor of a rotary apparatus.

Rotary shafts, in particular highly precise, air-borne rotary tables, are often sensitive to loads with a tilting moment. Overloading an air bearing may lead to the air gap collapsing and the two opposing bearing surfaces contacting one another. In this case, the rotary shaft must not be moved any further because otherwise damage may arise in the air bearing or the bearing jams.

Rotary shafts mounted on a rolling bearing must not be overloaded either. Although rolling bearings tend to jam less, the rolling bearings are, as a rule, manufactured highly precisely for accurate rotary shafts. In the case of rolling bearings, overloads lead to plastic deformations/wear and tear, e.g. of the rolling elements, as a result of which the accuracy is subsequently no longer provided. A rotary shaft mounted on a rolling bearing may be damaged, in particular if the overload is present for a relatively long time.

Spindle examinations of rotary tables mounted on a rolling bearing show that these often have an outstanding accuracy in the delivered state, but exhibit significant movement errors after a few years of operation. Here, the deterioration of the rotary shaft often goes unnoticed, as a result of which unreliable measurement results arise.

By way of example, the problem also affects rotary swivel joints, in which tilting moments or torques arise perpendicular to the axis of rotation, for example as a result of the installation position thereof or the employed sensors and probing systems. Often, the bearings of rotary swivel joints in metrology are designed to be relatively weak in this case, for reasons of weight or space.

If a rotary apparatus at the customer needs to be replaced, for example because the coordinate measuring machine (CMM) no longer passes the acceptance inspection, the reason for the wear and tear often remains unclear, or it is usually not possible to prove that the customer has overloaded the rotary shaft.

Some rotary tables, such as e.g. the RT-AB by Zeiss, have complicated and expensive bearing monitoring which, initially, is only employable for air-borne rotary shafts.

As a rule, tilting moments in the case of rotary shafts also cause faults in the rotational angle measuring system, in addition to deviations from the ideal rotational movement (movement error). In order to make at least the angle measuring system largely independent of the influences of the tilting moment, use is often made of expensive angle measuring systems with a dedicated bearing. Then, such angle measuring systems with a dedicated bearing are often afflicted by friction, as a result of which hystereses may arise.

It is an object of the invention to solve one or more of the aforementioned problems. In particular, a method for ascertaining a torque acting on a rotary apparatus or a force acting on a rotary apparatus should be specified. With the aid of the method, it should be possible to determine overloading of the rotary apparatus, in particular of a bearing of the rotary apparatus.

SUMMARY OF THE INVENTION

According to a fundamental concept of the invention, a torque which is directed across an axis of rotation of the rotary apparatus is ascertained by evaluating a deflection of the rotor and, alternatively or additionally, by evaluating a position error of the rotor. In particular, the value of the torque is ascertained within the scope of the invention. The invention makes use of a relationship between the torque on the one hand and the deflection and/or the position error on the other hand. The relationship may be ascertained or may be known for a rotary apparatus. With the aid of the relationship, it is possible to ascertain the torque from a determined deflection and/or a determined position error of the rotor.

The particular advantage of the invention lies in the fact that the torque is ascertainable in only one rotational position of the rotary apparatus or of a rotor of the rotary apparatus. Hence, no rotation of movable parts of the rotary apparatus, in particular of a rotor, is required. The method may occur without rotational movement.

If use is made of at least three detection devices, it is possible to determine a deflection, and the tilting moment and/or position error therefrom in a next step, in each rotor position or rotational position and in only exactly one such rotational position. By avoiding a rotation, it is possible to avoid damage to a rotary apparatus, in particular a rotary bearing, which would be the consequence of overloading parts of the rotary apparatus, if a torque is applied. This is particularly advantageous in the case of a sensitive bearing of the rotor, for example in the case of an air bearing. Air bearings may be damaged very quickly if they are overloaded by an excessive tilting moment on the borne rotor shaft. It is possible to ascertain the deflection and, therefrom, a tilting moment and/or position error in one rotational position without requiring a rotational movement or the setting of one or more further rotational positions, in the case of which a sensitive bearing could be damaged.

The terms "moment" and "torque" are used synonymously. A moment or torque directed across, in particular perpendicular to, an axis of rotation of a rotary apparatus is also referred to as "tilting moment". The phrase "tilting moment" is derived from the fact that a suitable force acting on the rotary shaft externally, which causes a torque across the axis of rotation, causes a greater or smaller deflection of the rotor in the form of a tilt. By way of example, the force is the weight of a workpiece which, with the center of gravity thereof, is positioned away from the axis of rotation of a rotor, as a result of which the rotor is deflected, in particular tilted, across the axis of rotation, in other words laterally, as a result of the weight. Tilting moments may also arise by centrifugal forces during the rotation of a rotor of a rotary apparatus.

A "deflection" of the rotor means that the rotor is rotated about a rotational axis which is at an angle to the axis of rotation of the rotor. Expressed differently, the deflection is a rotational movement of the rotor about a rotational axis which is at an angle to the provided axis of rotation of the rotor (also referred to as a tilt or a rotational deflection). The rotational axis at an angle to the axis of rotation of the rotor is preferably a virtual axis, i.e. not a physically embodied rotary shaft.

The torque may be expressed by the cross product $$M = r \times F$$

where F for example denotes the weight produced by a mass positioned on the rotary apparatus, said weight being directed parallel to the axis of rotation, or a force component parallel to the axis of rotation, and
r for example denotes the radial distance of the center of gravity of the mass from the axis of rotation.

The torque acts on the rotary shaft and/or on a part of the rotary apparatus rotatable about the axis of rotation, in particular a rotor and/or a measuring body or detection devices of a measuring system.

The aforementioned relationship between i) torque and ii) deflection and/or position error is, in particular, a (value) assignment or a functional relationship, which is yet to be explained in this description. Further values may be added during an assignment, such as, for example, the rotational position of the rotor, the phase angle of the center of gravity of the mass, on the rotary apparatus, for example in the machine coordinate system of the rotary apparatus, the phase angle of a mass, in particular of the center of gravity, relative to a detection device of a measuring system.

It is possible to obtain a functional relationship, in which a deflection of the rotor and/or a position error of the rotary apparatus is/are expressed as a function of the produced torque, or vice versa. Further variables may be added, such as, for example, the rotational position of a rotor, the phase angle of the center of gravity of the mass, on the rotary apparatus, for example in the machine coordinate system of the rotary apparatus, the phase angle of the center of gravity of a mass relative to a detection device of a measuring system. Hence, it is possible to obtain the deflection and/or the position error as a function of the torque, a rotational position and, optionally, even further variables.

According to a further fundamental concept of the invention, a force which is directed across an axis of rotation of the rotary apparatus is ascertained by evaluating a deflection of the rotor and, alternatively or additionally, by evaluating a position error of the rotor. In particular, the value of the force is ascertained. The invention establishes a relationship between the force on the one hand and the deflection and/or the position error on the other hand. The relationship may be ascertained or may be known for a rotary apparatus. With the aid of the relationship, it is possible to ascertain the torque from a determined deflection and/or a determined position error of the rotor. This relationship may also be present or ascertained in the form of an assignment or in the form of a functional relationship.

Within the scope of this invention, a force across the axis of rotation of the rotor is also referred to as transverse force or, in the corresponding context, only referred to briefly as "force". The transverse force acts on the rotary shaft and/or on a part of the rotary apparatus rotatable about the axis of rotation, in particular a rotor, detection devices and/or a measuring body, in particular a standard of a rotational position measuring system. Like the tilting moment, the transverse force causes a deflection of a rotor of the rotary apparatus across the axis of rotation of the rotor.

If a relationship, an assignment, a functional relationship, a method or apparatuses are described with reference to a torque within this description, with said torque being across an axis of rotation, the disclosure may refer to the transverse force as an alternative or in addition to the torque. By way of example, the transverse force may cause a translation of movable parts of a measuring system, for example of a measuring body or a detection device, which detects the relative position or change in position of the measuring body. By way of example, a transverse force may occur if a rotary shaft is deliberately or unintentionally installed at an angle, for example an obliquely installed rotary table or a rotary joint. A transverse force may be exerted on the rotary apparatus, for example using a probe of a coordinate measuring machine.

The deflection is ascertained in the invention on the basis of a relative position or relative movement of parts of a measuring system. In particular, the measuring system is a rotational position measuring system or an angle measuring system.

A relative position or relative movement which, in particular, is related to an initial state without an applied tilting moment or without an applied transverse force is considered, with the relative position or relative movement not being caused by a rotational movement of the rotor but instead by a deflection of the rotor. Expressed differently, the relative position or relative movement is a relative position or a change in the relative position (e.g. in comparison with a reference point) of a measuring body on the one hand and detection devices. In an aforementioned initial state without an applied tilting moment or without an applied transverse force, it is possible to determine reference points for detection devices, said reference points being referred to at a different point in this description.

In particular, the relative position or relative movement is a relative position or a change in the relative position (e.g. in comparison with a reference point) of parts or components of the measuring system. In particular, the considered parts are a measuring body and detection devices, which are described below.

According to a further concept of the invention, a tilt (oblique position of the rotor), in particular a tilt angle of the rotor, is ascertained by evaluating a deflection, i.e. the relative position or relative movement of parts of a measuring system. Alternatively, or additionally, the tilt (oblique position of the rotor), in particular a tilt angle of the rotor, may be ascertained by evaluating a position error of the rotor. By way of example, it is possible to ascertain or know a relationship between a tilt angle and a deflection of the rotor or a relationship between a tilt angle and a position error of the rotor, and an unknown tilt angle may be determined on the basis of an ascertained deflection or an ascertained position error with the aid of the relationship.

In particular, the invention specifies a method for ascertaining a torque and/or a force, which acts on a rotary apparatus and which is directed across an axis of rotation of a rotor of the rotary apparatus, wherein the rotary apparatus comprises a measuring system, the latter comprising:
 a measuring body; and
  at least three detection devices for detecting a relative position of detection device and measuring body and/or for detecting a change in the relative position of detection device and measuring body;

and wherein the method comprises the following steps:
- producing a torque and/or a force, which acts on the rotary apparatus and which is directed across the axis of rotation of the rotor of the rotary apparatus, wherein the torque and/or the force brings about a deflection of the rotor;
- ascertaining the deflection of the rotor and/or a position error of the rotor in a set rotational position of the rotor, from the relative position of the at least three detection devices and of the measuring body; and
- ascertaining the torque and/or the force at the one set rotational position of the rotor using a relationship, which is known or ascertained for the rotary apparatus, between
  - i) torque and/or force, and
  - ii) deflection and/or position error.

The method, in particular producing the torque and/or the force, may be carried out during operation of the rotary apparatus in the non-rotating state of the rotor, for example when a workpiece is positioned on the rotary apparatus. The operation of the rotary apparatus means the general use of the rotary apparatus, for example for measurement purposes. The rotary apparatus may be arranged in or at a coordinate measuring machine (CMM) or a machine tool. The method, in particular producing the torque and/or the force, may be carried out during operation, in particular during the measurement operation of the CMM or the machine tool. The ascertained torque may be taken into account in testing processes, displacement processes and/or correction processes of the coordinate measuring machine.

The method may comprise the step of determining a reference point for the detection devices. The reference point is a measurement value without a produced torque which acts on the rotary apparatus and without production of a force acting on the rotary apparatus and which is directed across the axis of rotation of the rotor of the rotary apparatus. Thus, a measurement value is ascertained for the purposes of ascertaining a reference point of a detection device, without an aforementioned torque or an aforementioned force being produced. A measurement value which is obtained under the influence of a torque and/or a transverse force can be related to the reference point. However, if a detection device measuring in absolute terms is used, it is not necessary to ascertain a reference point for a detection device. Absolute detection devices can easily be evaluated (e.g. the connection via bus systems without further hardware), resulting in increased attractiveness of the method.

In principle, the rotary apparatus is not restricted to a specific rotary apparatus. Preferably, the rotary apparatus is suitable or configured for use in a coordinate measuring machine (CMM), or the rotary apparatus is the rotary apparatus in a CMM. The invention is applicable for rotary apparatuses which are rotatable through arbitrary angles and/or arbitrarily often in one or more rotational directions. The invention is likewise applicable in the case of rotary apparatuses, the rotational movement of which is restricted, in which, for example, a rotation is only possible through a certain angle or in a restricted angular range.

Examples of rotary apparatuses are rotary joints, rotary apparatuses comprising a plurality of axes of rotation, rotary swivel joints having a plurality of axes of rotation, rotary tables and rotary swivel tables. A rotary table or rotary swivel table is preferred in the present invention. Rotary swivel tables with two axes of rotation often have an unsymmetrical structure. A mass which is rotatable about a second axis may introduce a tilting moment at the first axis of rotation and thereby produce a deflection or a position error of the first axis, even without a load caused by a workpiece on a rotary swivel table. Furthermore, weights may lead to deflection or position errors in the plurality of axes of rotation as a result of the oblique position of the axes. In one embodiment of the invention, the rotary apparatus is a rotary apparatus for a coordinate measuring machine, selected in particular from the aforementioned rotary apparatuses. In another aspect, the invention relates to rotary apparatuses which are employable in machine tools, robots and other applications in which a high accuracy is important.

A rotary apparatus preferably comprises a rotor and a stator. The stator is a stationary part of the rotary apparatus. The rotor is a rotating part of the rotary apparatus.

The rotary apparatus may comprise a rotary joint and/or a pivot bearing. A rotor and stator may be coupled to one another by way of the rotary joint or a pivot bearing. By way of example, a pivot bearing may be an air bearing or a rolling bearing. A rotary joint is not restricted to a specific rotary joint. A rotary joint may have an integral or multi-part embodiment. An integral rotary joint is also referred to as monolithic rotary joint. An integral joint comprises two regions, which are rotatable relative to one another about an axis of rotation and which, optionally, are also translatable in relation to one another. Moreover, an integral rotary joint may be embodied in integral fashion with the two elements to be connected. A multi-part joint comprises at least two parts or elements which are rotatable relative to one another about an axis of rotation.

In one variant of the invention, the measuring system is a rotational position measuring system. In this case, the measuring body is a standard for determining a rotational position or change in rotational position, in particular an angle position or change in angle position. Alternatively, a standard is also referred to as "reference body". In the case of a rotational position measuring system, a rotational position or change in rotational position, in particular an angle position or change in angle position, is detectable by way of the detection devices.

A rotational position error is determinable by means of the invention if the rotary apparatus comprises a rotational position measuring system as measuring system, said rotational position measuring system comprising at least three detection devices for ascertaining the rotational position. In particular, the rotational position error is the error of a rotational position measuring system.

The detection device is also referred to as sensor. In the case of a rotational position measuring system, the sensor may be a scanning head or reading head, by means of which a position or movement of a standard may be detected. The standard may have detectable marks. By way of example, the detection device may detect marks on the standard which pass through the detectable region of the detection device in the case of a rotational movement of the rotary apparatus. Here, the marks can be e.g. dash-shaped marks which extend in the radial direction in relation to the axis of rotation or which extend parallel to the axis of rotation. Corresponding standards are also referred to as pitch circle disks. Such marks are detected by the detection device, for example using an optical sensor. In a different variant, magnetic marks, e.g. by way of an arrangement with magnetic elements distributed around the axis of rotation, are possible. The corresponding detection device for detecting the magnetic marks may be e.g. a magnetoresistive sensor. Ideally, a multiplicity of the marks are situated distributed around the axis of rotation at equal angle distances from one another. In the case of a relative movement of detection device and standard, the detection device may detect a counter reading of passing marks or a signal for each passing mark.

In another variant, the measuring system is a position measuring system, in which a relative position or a change in position of the detection devices relative to the measuring body is ascertained. A deflection may be ascertained by the position or change in position. In this variant, the detection device is preferably a distance sensor. It is possible to ascertain a distance or a change in distance between the distance sensor and the measuring body. In particular, the measuring body in this variant is rotationally symmetrical, in particular cylindrical, disk-shaped or ring-shaped. Preferably, at least one distance sensor is directed onto a side surface of the measuring body, in particular onto the lateral surface of a cylindrical measuring body or the side surface of a disk- or ring-shaped measuring body. Using this, it is possible to ascertain a lateral deflection of the measuring body, possibly also a tilt. Preferably, in a manner combinable with the aforementioned distance sensors, at least two distance sensors are directed onto an end surface of the measuring body, in particular onto the circular end surface of a cylindrical measuring body, the circular end surface of a disk-shaped measuring body or the ring surface of a ring-shaped measuring body. A tilt of the measuring body may be ascertained with these distance sensors.

In the method according to the invention, the torque may be produced by:
  positioning a mass, in particular a workpiece, on the rotor, wherein the center of gravity of the mass is eccentric in relation to the axis of rotation, and/or
  exerting a force on the rotor by contacting the rotor or a workpiece positioned on the rotor with a measuring system of a CMM, in particular by probing using a measuring system of the CMM, in particular using a probe.

Probing may occur at a position which is eccentric in relation to the axis of rotation of the rotor. By way of example, if a probe of the CMM exerts a force on the rotor nearby the axis of rotation, by probing the rotor or a workpiece positioned on the rotor, a torque arises from the radius (distance of the probe from the axis of rotation) and the probing force of the probing system of the CMM or of the probe. The torque causes a deflection of the rotor. The probing position may also lie exactly in line with the axis of rotation and probing may occur at a height (Z) as seen from the rotor. A torque may arise by way of a lever (Z-height) present if the probing force acts (partly) across the axis of rotation.

The transverse force may be produced by a deflection or oblique position of the rotor, as a result of which a force component is obtained, said force component being aligned across, in particular perpendicular to, the axis of rotation, for example by virtue of decomposing the gravitational force acting on the axis of rotation into two force components, of which one is aligned across, in particular perpendicular to, the axis. Alternatively, or instead, a transverse force may be produced by probing a workpiece.

The method step "ascertaining the deflection of the rotor and/or the position error of the rotor at a rotational position of the rotor" is described below:

A position error considered here may result from a deflection of the rotor. In accordance with the invention, it is possible to ascertain only the deflection which is produced by the tilting moment and/or the transverse force. Additionally, or alternatively, it is possible to ascertain a produced position error. Ascertaining the deflection is explained first, followed by ascertaining a position error.

During the intended operation of the measuring system, the detection devices interact with a measuring body. A movable measuring body or at least three movably mounted detection devices are put into relative motion when the rotor is put into motion. The movable measuring body and/or the movable detection devices may be coupled to the rotor in such a way that a movement of the rotor causes a movement of the measuring body and/or of the detection devices.

The relative position or the change in the relative position of detection devices in relation to measuring body, used in the method according to the invention, is a different position or change in the relative position than the one emerging from the intended rotational movement of the rotor about the axis of rotation of the rotary apparatus.

The actually provided and desired functionality and function of a detection device are as follows: In the case of rotation of the rotor about the provided axis of rotation of the rotary apparatus, either the measuring body or the detection devices are co-rotated and either the measuring body or the detection devices undertake a rotational movement about the provided axis of rotation of the rotary apparatus. This movement is used to measure a rotational position. By way of example, the measuring body is moved along the detection device and the detection device is able to detect a rotational position or a change in rotational position, in particular an angle (position) change, for example by virtue of marks moved past the detection device being detected by the detection device. Alternatively, the detection device may be moved along a measuring body positioned in a manner secured against rotation.

By contrast, the following effect is used in the present invention, said effect resulting from a faulty movement of the rotor and, as a consequence thereof, a faulty movement of the measuring body or of the detection devices:

According to the invention, there is the production of a torque and/or a force, which already acts on the rotary apparatus during standstill of the rotor, i.e. when there is no rotational movement of the rotor. Resulting from the deflection of the rotor during the standstill of the rotor, there is a relative position of detection devices in relation to the measuring body which has changed in comparison with previously (i.e. prior to the deflection) or there is a change in the relative position of detection devices in relation to the measuring body. Thus, this changed relative position or change in the relative position has not been caused by a rotational movement of the rotor about the provided axis of rotation of the rotary apparatus but by the rotation of the rotor about an axis of rotation which is at an angle to the provided axis of rotation. Accordingly, the deflection of the rotor may be ascertained from the relative position (resulting from the deflection) of detection devices in relation to the measuring body when the rotor is at a standstill.

In the case of the deflection of the rotor, the measuring body may be rotated about a rotational axis which is at an angle to the provided axis of rotation of the rotor. This is the same rotational axis through which the rotor is also rotated during the deflection movement when measuring body and rotor are coupled to one another in an immovable manner in relation to one another. The rotational movement of the measuring body about the rotational axis which is across the provided axis of rotation of the rotor results in a relative movement of the measuring body and detection devices which is detected at, or by, the detection devices as a translational movement of the measuring body relative to the respective detection device, with this translational movement extending across the extent of the axis of rotation.

Alternatively, in the case of the deflection of the rotor, an arrangement of detection devices may be rotated about a rotational axis which is at an angle to the provided axis of rotation of the rotor. This is the same rotational axis through which the rotor is also rotated during the deflection movement when the arrangement of the detection devices and the rotor are coupled to one another in an immovable manner in relation to one another. The detection devices are locally fixed relative to one another in the arrangement of the detection devices. The rotational movement of the arrangement of the detection devices about the rotational axis which is across the provided axis of rotation of the rotor results in a relative movement of the measuring body and detection devices which is detected at, or by, the detection devices as a translational movement of the measuring body relative to the respective detection device. The translational movement thus perceived at/by the detection devices extends across the extent of the axis of rotation.

According to the invention, at least three, preferably four, detection devices are present.

A rotation of the rotor about the provided axis of rotation of the rotary apparatus may be distinguished from a deflection of the rotor using at least three detection devices.

The detection devices and the measuring body are movable relative to one another. The measuring body may be movable, in particular rotatable, and the detection devices may be stationary, for example fixed in relation to a stator. In particular, the measuring body is coupled to a rotor in a manner secured against rotation and in a manner secured against translation, and said measuring body also carries out a movement of the rotor. In an alternative variant, the detection devices may be mounted in a movable, in particular rotatable, manner and the measuring body may be stationary, for example fixed in relation to a stator. Combinations thereof are possible. What is decisive is the relative movability of detection devices and measuring body. If the measuring body is mounted in a rotatable manner, then it is preferably mounted in a manner rotatable about the axis of rotation of the rotor. If the detection devices are mounted in a rotatable manner, then they are preferably mounted in a manner rotatable about the axis of rotation of the rotor.

Advantageously, a bearing of the measuring body, or a bearing of the detection devices, may be coupled to a bearing of the rotor of the rotary apparatus. Here, the rotational position measuring system is embodied without independent bearing of the measuring body or of the detection device, which is particularly cost-effective. In this variant, an advantage of the invention is that the so-called integral bearing of a measuring system, in particular the independent bearing of a measuring body or, alternatively, of the detection devices, may be dispensed with. In particular, the measuring body and the rotor may be borne by a common bearing, or the detection devices and the rotor may be borne by a common bearing. In particular, a bearing is a pivot bearing, the bearing means is a pivot bearing means. However, in general, the method is also applicable to measuring systems with an integral bearing of a measuring body or a detection device.

The measuring body may be a standard, as already mentioned above, in particular if the measuring system is an aforementioned rotational position measuring system. A standard expresses values of a rotational position measured variable or a sequence of values of a rotational position measured variable. The rotational position measured variable may represent a rotational position of the rotor or said rotational position measured variable may be transferable or convertible into a rotational position, for example an angle. An example of a standard for ascertaining the rotational position is a disk or a ring with marks at a predetermined, preferably constant, distance. By way of example, the mark spacing specifies a change in rotational position or a rotational position increment, in particular an angle increment.

The detection devices and the standard are arranged relative to one another in such a way that a relative position, or a change in relative position, or a relative movement between standard and detection devices is ascertainable by the detection device.

Using the detection devices it is possible to detect values of a rotational position measured variable or changes in value of the rotational position measured variable, for example the marks or a movement of marks relative to the detection devices.

Exemplary detection devices are magnetoresistive, magnetic, capacitive or optical detection devices.

The measuring system, in particular a rotational position measuring system, may be a measuring system which measures in increments or absolute values.

As mentioned previously, use is made of at least three detection devices for detecting a relative position of detection device and measuring body and/or for detecting a change in the relative position of detection device and measuring body. Three detection devices may be arranged offset relative to one another along a circle with a center at the point of rotation (or in the axis of rotation) of the rotor. Expressed differently, the detection devices may be arranged distributed around the axis of rotation of the rotary apparatus.

In particular, the measuring body is cylindrical, disk-shaped (which should be understood to mean a cylinder with a relatively small height) or ring-shaped.

In particular, the measuring body has a circular or substantially circular external circumferential line.

If the measuring body is a standard, detection devices are aligned axially onto a disk-shaped or ring-shaped standard in one variant. Expressed differently, the sensors detect a ring surface or a circular surface on which, for example, detectable markings are arranged. Expressed in another different way, the detection devices are then oriented toward the standard in such a way that they look onto a circular or ring surface of a standard extending horizontally or substantially horizontally from above and/or from below.

In an embodiment, the deflection may be ascertained if there is a measuring system comprising four detection devices, by means of which a position or change in position of the measuring body relative to the detection devices may be detected in each case. Four detection devices are preferably arranged distributed around the axis of rotation by approximately 80-110°, preferably by approximately or exactly 90°, in each case. The detection devices may be arranged offset relative to one another at the aforementioned angle (in the aforementioned angle range) along a circle with a center at the point of rotation (or in the axis of rotation) of the rotor. Expressed differently, the four detection devices are arranged along a circle, the center point of which coincides with the axis of rotation of the rotor, in such a way that the relative angles thereof in relation to one another are in each case (i.e. for each relative angle) 80-110°, preferably 90° or approximately 90°. In particular, the phrase "approximately 90°" means a relative angle of 85-95°. A relative angle means an angle included by a first line and a second line, wherein the first line extends from the axis of rotation of the rotor up to a first detection device, preferably to a center of the detection device, and the second line extends from the axis of rotation of the rotor up to an adjacent detection device, preferably to a center of the adjacent detection device. The aforementioned lines are imagined, virtual lines. In particular, the measuring body is disk-shaped or ring-shaped. In particular, the measuring body has a circular or substantially circular external circumferential line. The detection devices may be arranged offset from one another by approximately or exactly 90° along the disk-shaped or ring-shaped standard, in particular along a circular or substantially circular external circumferential line, and said detection devices may interact with the measuring body.

Using four detection devices, it is possible to ascertain a vector component of a deflection in a first spatial direction, for example an X-direction, of:
  a relative movement of the detection devices relative to a measuring body and/or
  a deflection of the rotor and/or
  a torque in the first spatial direction, ascertainable from the relative movement and/or the deflection,
by way of a first pair of detection devices. These detection devices of the first pair of detection devices are preferably offset from one another by 180° along a circle with a center at the point of rotation (or in the axis of rotation) of the rotor, i.e. said detection devices lie opposite one another.

Using four detection devices, it is possible to ascertain a vector component of a deflection in a second spatial direction, for example a Y-direction, of:
  a relative movement of the detection devices relative to a measuring body and/or
  a deflection of the rotor and/or
  a torque in the second spatial direction, ascertainable from the relative movement and/or the deflection,
by way of a second pair of detection devices. These detection devices of the second pair of detection devices are preferably offset from one another by 180° along a circle with a center at the point of rotation (or in the axis of rotation) of the rotor, i.e. said detection devices lie opposite one another.

The first pair of detection devices is preferably offset relative to the second pair of detection devices by 90° or approximately 90° along a circle with a center at the point of rotation (or in the axis of rotation) of the rotor such that all four detection devices are preferably offset by 90° or approximately 90° from one another in each case.

Ascertaining the position error is explained below:

The position error denoted thus in this invention, also referred to here as a rotational position error or eccentric error, describes a deviation of a rotational position value indicated by a rotational position measuring system of the rotary apparatus from an "actual" rotational position value, considered to be correct, which is also referred to as reference rotational position value. Preferably, the rotational position error only specifies the error component caused by the torque and/or the transverse force. Further errors or error components, e.g. the graduation error of a scale, are preferably either ignored or ascertained by a separate correction and eliminated where necessary.

In particular, the error of a rotational position measuring system, in particular of an angle measuring system, of the rotary apparatus is determined when ascertaining the position error of the rotary apparatus. The rotational position measuring system comprises an aforementioned standard and the aforementioned detection devices. By way of example, the rotational position measuring system is integrated into the rotary apparatus or assigned to the rotary apparatus, and it is, in particular, an angle position measuring system.

A reference rotational position value may be a value indicated by a reference apparatus, the rotational position of which is assumed to be very precise and correct, and the rotational position value thereof is compared to the rotational position value indicated by a rotational position ascertainment system of the rotary apparatus. Ascertaining the position error of the rotary apparatus at the at least one rotational position may therefore be carried out using a reference measuring system or an aforementioned reference apparatus.

By way of example, a reference apparatus comprises a highly accurate, calibrated rotational position measuring system. An example of a reference apparatus is a reference rotary apparatus, in particular a reference rotary table, by means of which a rotational position is measurable in a very accurate manner. A method for ascertaining the rotational position error using a reference rotary apparatus is described, for example, in the international patent application PCT/EP 2013/050328. Furthermore, methods for ascertaining a rotational position error, in which a calibrated mirror polygon is used, are known.

By way of example, the position error becomes noticeable in that a rotational position measuring system of a rotary apparatus indicates a value deviating from the actual rotational position. The position error considered by this invention is caused by a torque which is across, in particular perpendicular to, the axis of rotation of the rotary apparatus, i.e. acts across the latter, in particular perpendicular thereto, and/or a force which is across, in particular perpendicular to, the axis of rotation, i.e. acts across the latter, in particular perpendicular thereto. The torque and/or the force influence a rotational position measuring system in such a way that the latter indicates an erroneous rotational position value. If a standard of a rotational position measuring system, for example a disk with a detectable line measure, is borne e.g. together with a rotor of the rotary apparatus on a common bearing, a deflection of the rotor also brings about a deflection or displacement of the standard relative to a detection device, which detects a rotational position value on the standard. A rotational position error arises as a result thereof. However, a rotational position error may also arise if there is no common bearing but, for example, the rotor and the standard are mechanically coupled by other means such that a movement error of the rotor causes a movement error of the standard.

Described below is how a relationship between
  i) torque and/or force, and
  ii) deflection and/or position error
may be expressed and obtained.

The relationship for ascertaining the torque and/or the force from the deflection or the position error may be a (value) assignment mentioned below or a functional relationship mentioned below.

In particular, the relationship is a relationship between
  i) torque and/or force, and
  ii) a maximum deflection or a maximum position error.

Preferably, a value of the deflection or a value of a position error follows a trigonometric function. The maximum deflection or maximum position error may be defined as half the distance between the minimum and maximum on the ordinate of the trigonometric function (amplitude, half the margin of error) or as distance between the minimum and maximum on the ordinate of the trigonometric function (full margin of error). The relationship, in particular a functional relationship, between torque and/or force and maximum deflection or maximum position error may be linear or describable by a polynomial.

The relationship may contain one or more rotational position values. The one set rotational position in the method according to the invention may correspond to one of these rotational position values of the relationship, and so the torque and/or the force are ascertainable at this one set rotational position by way of the relationship. If a different rotational position (e.g. a different angle value) than the one set rotational position is selected, the relationship may be used to ascertain the torque and/or the force since the relationship, which contains a plurality of rotational position values, is also known for this rotational position value.

The position error and the deflection of the rotor may be dependent on the rotational position of the rotor or may change with the rotational position, wherein a plurality of rotational position values are preferably taken into account in this case.

The assignment may contain information in respect of torques and assigned deflections or position errors at a rotational position or at a plurality of rotational positions. In an exemplary manner, the assignment may be a collection of value pairs or value triples, which alternatively could look like the following:
  torque and deflection,
  torque and position error, or
  torque, deflection and position error.

Optionally, a constant or variable rotational position may be added to these value pairs or value triples.

A relationship, in particular an assignment, may alternatively or additionally contain information in respect of forces and assigned deflections or position errors at a rotational position or at a plurality of rotational positions. In an exemplary manner, an assignment may be a collection of value pairs, value triples or value quadruples, which alternatively could look like the following:
  force and deflection,
  force and position error,
  force, deflection and position error,
  force, torque and deflection,
  force, torque and position error, or
  force, torque, deflection and position error.

Optionally, a constant or variable rotational position may be added to these value pairs, value triples or value quadruples.

By way of example, an assignment may be present in a tabular and preferably electronically storable and readable form. Storage may take place in a memory device, for example of a CMM. The assignment may contain arbitrary numbers of such value pairs/triples/quadruples. With the aid of the assignment, it is possible to ascertain, for example, how large a torque or a transverse force is in the case of a specific deflection at a specific rotational position. By way of the assignment, each of the aforementioned variables may be ascertained depending on the other remaining variables in each case.

The functional relationship may be present in the form of a mathematical function. By way of example, the functional relationship may specify one of the following relationships:
  torque as a function of the deflection and, optionally, the rotational position,
  torque as a function of the position error and, optionally, the rotational position,
  transverse force as a function of the deflection and, optionally, the rotational position,
  transverse force as a function of the position error and, optionally, the rotational position,
  torque and transverse force as a function of the deflection and, optionally, the rotational position,
  torque and transverse force as a function of the position error and, optionally, the rotational position.

Further variables may be added, such as position of a mass or of a center of gravity (e.g. workpiece) on the rotary apparatus, in particular in the machine coordinate system of the rotary apparatus, or position of a mass, or of a center of gravity, relative to a detection device of a measuring system. In particular, a functional relationship is a computational prescription, into which one or more variable are entered as variables, for example a value of a deflection or a rotational position, and from which the dependent variable, such as torque or transverse force, is calculable when the variables are inserted.

According to the invention, a torque or a transverse force may be represented in various components, in particular vector components, for example as an X-component and Y-component. Each vector component may be described by an assignment or expressed by a functional relationship. A resultant torque (also referred to as total torque) or a resultant transverse force (also referred to as total transverse force) may be ascertained, in particular calculated, from the components. The functional relationship, in particular a computational prescription, may be present in an electronically storable and readable form. Storage may take place in a memory device, for example of a CMM.

An aforementioned relationship may be obtained according to a method comprising:
  a) producing at least one torque and/or at least one force, which is directed across the axis of rotation of the rotor of the rotary apparatus, at at least one rotational position of the rotor;
  b) ascertaining a deflection and/or a position error of the rotary apparatus, which is caused by the at least one torque and/or the at least one force, at the at least one rotational position; and
  c) ascertaining a relationship between (i) torque and/or force and (ii) deflection and/or position error.

Variants for producing a torque or a force are discussed elsewhere in this disclosure, just like ways for ascertaining a deflection or a position error.

Ascertaining the relationship in the form of an assignment may be carried out by: Assigning the at least one torque, and/or assigning at least one force, to the deflection in each case assigned at this torque and/or at this force, and/or to the position error in each case ascertained at this torque or at this force, at the at least one rotational position. A functional relationship may be ascertained by forming an assignment and subsequently analyzing the assignment. By way of example, it is possible to find a mathematical function which expresses the value assignment, for example by means of known fitting methods.

The method for ascertaining a relationship may be carried out outside of, or within, a CMM. The method may be ascertained once or a plurality of times for a specific design of a rotary apparatus, before the latter is installed in a CMM (again). By way of example, the method may be carried out after a manufacturing process of a rotary apparatus, in particular within the scope of a final acceptance. In a further variant, the method may be carried out in a CMM, with an installed rotary apparatus, for example in preparation of the measurement operation or prior to the measurement operation, or in a measurement pause.

The produced torque is known in terms of the value thereof or the value thereof is determinable in the method specified above for ascertaining a relationship. By way of example, the torque is produced by one or more of the following measures:

positioning a mass on the rotor of the rotary apparatus, wherein the center of gravity of the mass is preferably eccentric in relation to the axis of rotation of the rotor or localized next to the axis of rotation of the rotor, and/or exerting a force on the rotor by probing the rotor or an object (e.g. workpiece) situated on the rotor.

By way of example, in order to determine the value of a first torque or of a further torque, the weight of an object of a known mass and an eccentric offset of the object on the rotor relative to the axis of rotation of the rotor may be measured and the torque may be calculated therefrom.

Further, the following methods are available for ascertaining the size of a produced torque which is across, in particular perpendicular to, the axis of rotation of a rotor of the rotary apparatus:

A deflection of the axis-of-rotation rotor, which acts as a translation at the location of a standard of the angle measuring system, could be measured by distance sensors. To this end, already available distance sensors of a measuring system may be used. It is possible to ascertain a comparison of measurement values from distance sensors before and after the application of the torque. Or it is possible to use an absolute measuring sensor, in which a deflection may be ascertained on the basis of a measurement value, If, as described in the preceding point, use is made of distance sensors, the distance sensor may respectively be directed onto an already mentioned measuring body which is attached to the rotor of the rotary table and which is preferably rotationally symmetrical. Measuring bodies in the form of a cylindrical or (double) spherical measuring body, onto which a sensor may be directed, are known, for example, from the international patent application WO 2013/007285 A1, in particular FIGS. 1 to 4 and 12.

In the methods mentioned in the two aforementioned points, it is initially possible to ascertain a relationship between tilting moment/torque and tilt angle, measured with distance sensors. This relationship may be ascertained by virtue of e.g. applying a known mass onto the rotor at a known distance from the axis of rotation and determining a deflection of the axis-of-rotation rotor in a rotational-position-dependent manner. Since mass and center of gravity as well as the distance of the center of gravity from the axis of rotation are known, the tilting moment is also known. It is possible to measure the tilt of the rotor using the distance sensors. If different tilting moments are applied, it is possible to determine the tilt in a tilt-moment-dependent manner. Accordingly, it is possible to ascertain the relationship between tilting moment and tilt such that, if an unknown tilting moment is applied, the tilting moment may be ascertained from the tilt of the rotor and the known relationship.

A produced transverse force is known in terms of the value thereof or the value thereof is determinable in the method specified above for ascertaining a relationship. The first force and the optional at least one further force are preferably produced by a deflection or oblique position of the rotor, as a result of which a force component is obtained, said force component being aligned across, in particular perpendicular to, the axis of rotation, for example by virtue of decomposing the gravitational force acting on the axis of rotation into two force components, of which one is aligned across, in particular perpendicular to, the axis. Exerting a transverse force by a probing system, for example of a CMM, is a further variant.

A functional relationship between (i) torque and/or force and (ii) deflection and/or position error may be obtained by evaluating the obtained values for (i) torque and/or force and (ii) deflection and/or position error. By way of example, a mathematical function may be ascertained using known approximation methods.

Further preferred embodiments and variants of the invention are described below:

In an embodiment of the invention, the output of a warning and/or the prevention of a rotational movement of the rotor occurs if a predetermined threshold of the torque and/or of a force is reached or exceeded. As a result of this, it is possible to provide a warning about an overload of the rotor or of a bearing, on which the rotor is mounted in a rotationally movable manner, and it is possible to avoid overloading. This is advantageous, particularly in the case of air bearings.

In an embodiment of the invention, the method is used to ascertain a positioning of the mass which is as free from torques and/or as free from forces as possible. The mass is positioned on the rotor in such a way that the deflection or the ascertained position error is minimal or zero.

The method for centering workpieces may be used in this embodiment. The workpiece is completely centered if no torque is present anymore. The center of gravity of the workpiece is likewise centered if no torque is present anymore. The workpiece and the center of gravity are centered in the case of a symmetrical workpiece. Otherwise, in the case of unsymmetrical workpieces, only the center of gravity is centered.

In an extension of the method according to the invention, it is possible to record ascertained tilting moments and/or transverse forces. By way of example, by such recording or storing, it is possible to provide evidence for an overload of a rotary shaft by way of a tilting moment that was too high or a transverse force that was too high, which occurred in the past.

In general, it is possible to carry out the method with all conventional measuring systems, in particular conventional position or rotational position measuring systems.

How the phase angle of the center of gravity of a mass, e.g. of a workpiece, may be ascertained in a method according to the invention is explained below. Further, a separate method for ascertaining a phase angle of the center of gravity of a mass is explained.

The above-described method for ascertaining a tilting moment and/or a transverse force may furthermore comprise:

ascertaining a phase angle of the center of gravity of the mass in a coordinate system of a stator of the rotary apparatus and/or in a coordinate system of the rotor from the deflection of the rotor or the position error of the rotor.

In this method variant, the position of the mass or of the center of gravity of the mass, in particular of a workpiece, is determined in addition to the tilting moment or the transverse force.

The origin of the mentioned rotor or stator coordinate system is at, for example, the center point or rotational point of the rotor. By way of example, the coordinate system is a two-dimensional coordinate system, in which the phase angle of the center of gravity of the mass is describable.

In a further variant of the method, the method comprises:
ascertaining a deflection of the rotor in a first spatial direction and a deflection of the rotor in a second spatial direction, at a rotational position of the rotor; and
ascertaining the phase angle of the center of gravity of the mass from the deflection in the first spatial direction and from the deflection in the second spatial direction.

This method is particularly advantageous since at least three, preferably four, detection devices interact with a measuring body. No rotational movement is required in this case; instead, the phase angle of the center of gravity may already be ascertained at one rotational position of the rotor, which may be preset.

In a further aspect, the invention relates to an independent method for ascertaining the phase angle of the center of gravity of a mass on a rotor of a rotary apparatus in a coordinate system of a stator of a rotary apparatus and/or in a coordinate system of the rotor, wherein the rotary apparatus comprises a rotational position measuring system comprising:
a measuring body;
at least three detection devices for detecting a relative position of detection device and measuring body and/or for detecting a change in the relative position of detection device and measuring body; and
wherein the method comprises the following steps:
positioning a mass on a rotor of the rotary apparatus;
ascertaining a deflection of the rotor at a set rotational position of the rotor, from the relative position of the at least three detection devices and of the measuring body; and
ascertaining the phase angle of the center of gravity of the mass in the one set rotational position from the deflection of the rotor.

As generally in this invention, the mass may be a workpiece mass.

Ascertaining a deflection of the rotor at a rotational position by way of a rotational position measuring system comprising a measuring body and detection devices was already explained above in this description and reference is made thereto in the entirety thereof.

Ascertaining the phase angle of the center of gravity of the mass in a coordinate system of a stator and/or of a rotor from a deflection of the rotor was already explained above in general and in specific variants.

BRIEF DESCRIPTION OF THE DRAWINGS

The invention is described below on the basis of exemplary embodiments. In the figures.

DETAILED DESCRIPTION OF THE PREFERRED EMBODIMENTS

1. General Considerations.

Tilting moments acting on the rotor of the rotary shaft cause a tilt of the rotor. Since a lever is usually present between rotational point (bearing site) and standard, the tilt causes an eccentricity of the standard. An eccentricity of the standard causes a so-called eccentric error in the measured angle positions. The position error is greatest if the displacement of the standard is perpendicular to the angle sensor or reading head, and may be calculated as follows:

$$\alpha = s/r$$

where $\alpha$=position error,
s=eccentric amplitude
r=radius of the standard

Trials have shown that the relationship between the amplitude of the so-called eccentric error and the causative tilting moment is often good-natured and, for example, describable by a straight line or a polynomial. The trials were carried out using a rotary table mounted on an air bearing. The assumption is made that the results may also be transferred to rotary tables mounted on a rolling bearing. The results in FIGS. 1 and 2 were produced within the scope of a calibration process, by comparing the position values with a reference rotary table, as described below.

2. Ascertaining a Relationship Between Tilting Moment and Position Error.

Below, ascertaining a relationship between tilting moment and position error is shown in an exemplary manner in points 1 and 2.

2.1. Standard CAA Data Recording Without Tilting Moment.

Figure 1:
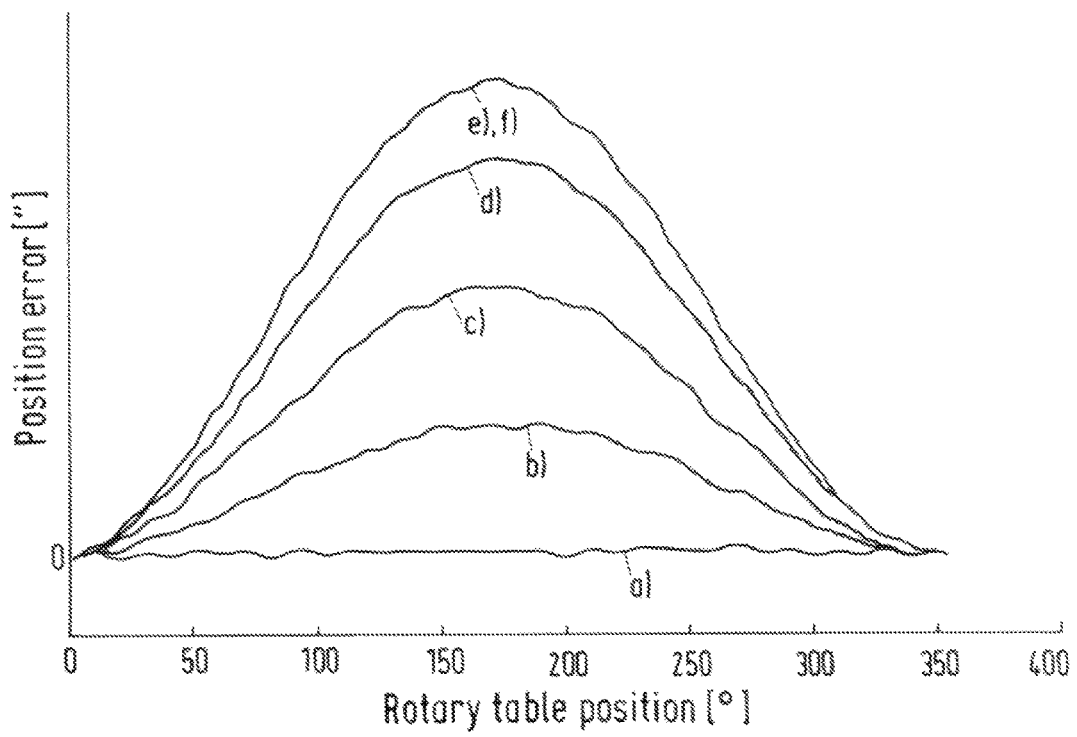
FIG. 1 shows a position error of a rotary table depending on the rotor rotational angle and the applied tilting moment.

For the purposes of measuring the position error without tilting moment, a setup was used as depicted schematically in FIG. 1 of the international patent application PCT/EP 2013/050328. This international patent application also describes a method for ascertaining the rotational position error of a rotary table with the aid of a reference rotary table in detail, in particular in the example part starting on page 81.

2.2. Computer Aided Accuracy (CAA) Data Recording With a Tilting Moment. Use is made of the same trial setup as in point 1 or in FIG. 1 of PCT/EP 2013/050328. The rotary table had bearing monitoring, by means of which an applied tilting moment may be ascertained. The bearing of the rotary table has a sensor system described in an exemplary manner in the patent application DE 10 2008 058 198 A1. Various angle positions of the rotary table were set in the case of different masses applied to the rotary disk of the rotary table to be measured and tilting moments emerging from the weight thereof. The masses were positioned on the rotor rotary disk in an eccentric fashion in relation to the axis of rotation. The tilting moment and the phase between the zero position of the stator coordinate system of the rotary table and the applied mass were ascertained or recorded from monitoring the bearing of the rotary table to be measured (test object). Here, 12 data records a)-f) with different, increasing tilting moments and, if a tilting moment is present, with the same phase were created. FIG. 1 shows the arising error pattern.

All position error curves shown in FIG. 1 may be described by a cosine function in the radian measure. The relationship between position error and tilting moment is position error=−M*c*cos (t+pM−pRH)

where
M=current tilting moment in the rotary table-stator coordinate system [Nm]
c=scaling factor "position error per newton-meter" in [Rad/Nm]
t=rotary table position in the rotary table-stator coordinate system [Rad]
pM=phase angle of the applied mass and the tilting moment produced thereby in the rotary table-stator coordinate system [Rad], relative to the set zero point thereof
pRH=reading head position [Rad] in the rotary table-stator coordinate system relative to the set zero point of the rotary table-stator coordinate system.

Figure 2:
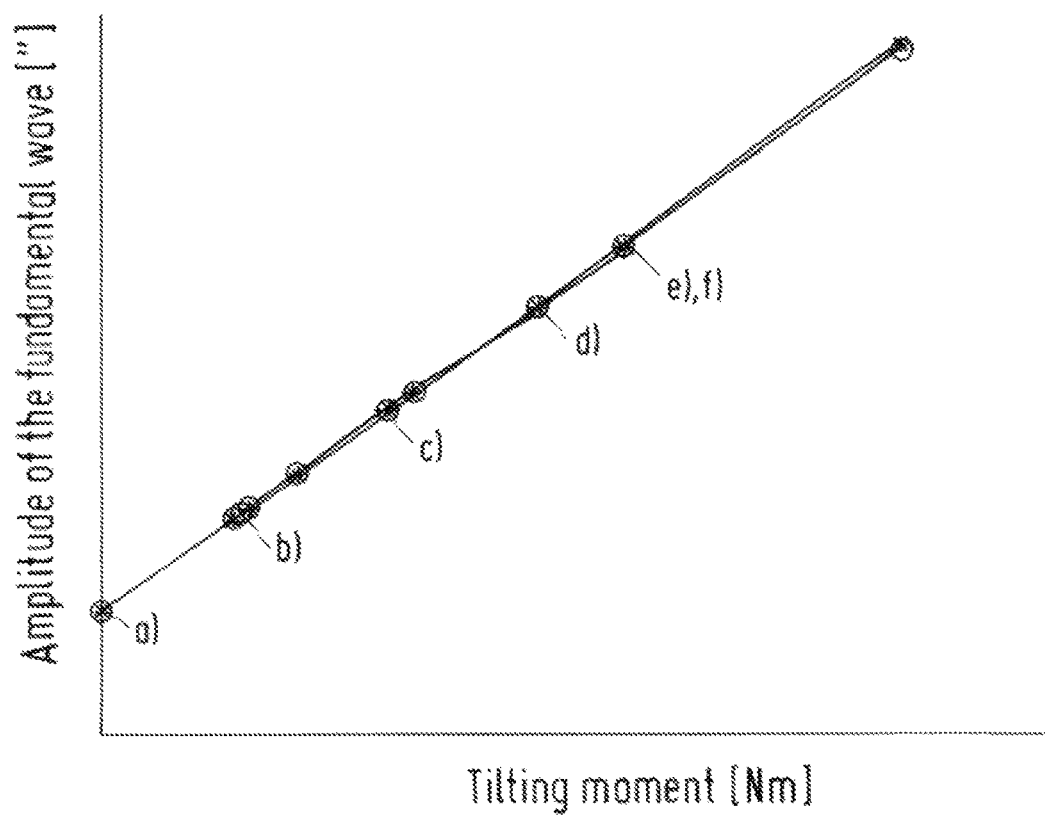
FIG. 2 shows the amplitude of an error of the fundamental wave (half maximum error margin) depending on the applied tilting moment.

By way of the variables pM and pRH, it is possible to map various positions of both a mass (which produces a tilting moment) and a detection device, in this case a reading head of the angle encoder, in the rotary table-stator coordinate system, related to a zero point of the coordinate system. As a result of there being a linear relationship between tilting moment and amplitude, as shown in FIG. 2, the tilting moment M with a scaling factor c may be placed in front of the cosine function. The linear relationship is given in this example, but need not be present in other rotary tables. An influence of the tilting moment on an angle measuring system with integral bearing was examined and could be demonstrated. The tilting moment influence or the caused error is smaller than in the case of the system without an integral bearing, as examined above, by one order of magnitude and nonlinear. In this case, the influence of the tilting moment on the amplitude may be described by a polynomial.

The cosine function illustrated above is obtained when the standard of the angle encoder, for example a graduated disk guided along a detection device (here a reading head), circulates. In FIG. 1, all position error curves are set to the position error of 0 at the rotary table position 0, which is an arbitrary setting and serves the purposes of a comparison in this case.

FIG. 2 shows the amplitude of the fundamental wave of the deflection of the rotor or of the displacement of the angle measuring system relative to the reading head depending on the applied tilting moment. The amplitude of the fundamental wave of FIG. 2 is also ascertainable from FIG. 1 if the maximum of the curves shown therein is halved. In addition to the amplitudes of the measurements from FIG. 1, the plot of FIG. 2 also includes amplitudes of further measurements. The evaluation yields a very good linear relationship between tilting moment and amplitude of the fundamental wave of the position error.

The error measurements in FIG. 1, with tilting moment load, have already been corrected by the error of the rotary table without a load (see point 2.1 above, CAA data recording without tilting moment), i.e. this error has already been removed by calculation. Hence, FIG. 1 only shows the errors additionally caused by the tilting moment.

3. Setup of a Rotary Apparatus Comprising a Standard and a Detection Device.

Figure 3:
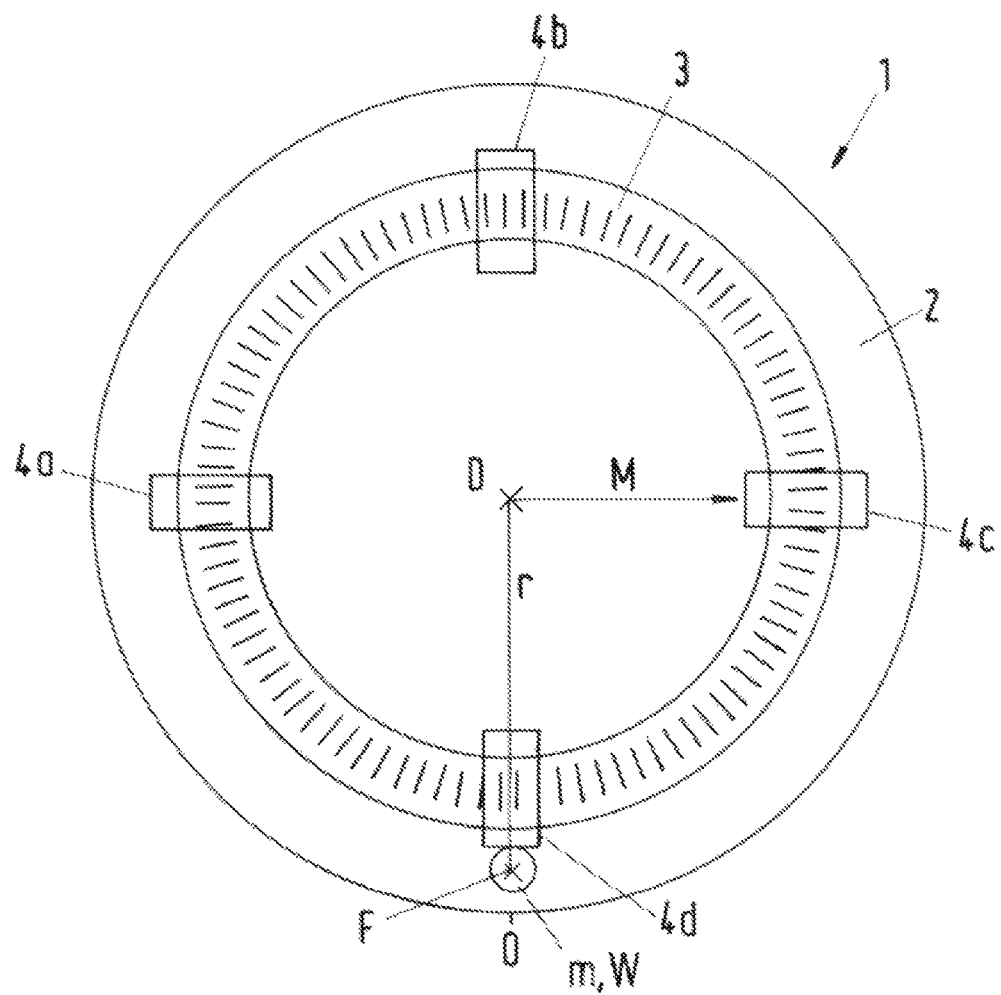
FIG. 3 shows the schematic plan view of a rotary apparatus with an applied mass.

FIG. 3 shows the rotary apparatus 1 with the rotor 2, in this case as a rotary table with the rotor in the form of a rotary disk 2. The mass m has been placed onto the rotary disk 2 at the rotational position of zero in the stator coordinate system. In the equation above, pM would be zero in this case. The mass m is positioned at the distance r (distance of the center of gravity) from the axis of rotation D. The axis of rotation D is perpendicular to the plane of the drawing.

The observer views the rotary apparatus 1 from above. A weight F=m*g acts on the mass m, said weight acting downward, into the plane of the drawing, in the direction of view of the observer. Here, the tilting moment M acting perpendicular to the axis of rotation D results as a product M=rF.

Further, FIG. 3 depicts the standard 3 in the form of a graduated disk and the detection devices 4a, 4b, 4c, and 4d (which are also referred to as detector or reading head in the example).

The detection devices 4a, 4b, 4c, and 4d are each offset by 90° from one another. Two pairs of detection devices 4a/4c and 4b/4d are formed, with the detection devices in a pair lying opposite one another, i.e. being offset by 180° from one another.

In the equation above pRH is −90° or −Π/2, relative to the zero position in the stator coordinate system, at the reading head 4a in this setup. The standard 3 is mounted together with the rotary disk/rotor 2 and tilted together with the latter. A deflection as a result of the weight of the mass m on the rotor has the effect of a translation of the standard 3 relative to the detector 4a and 4c at the location of the detector 4a and 4c, from which a position error results. No translation of the standard 3 is detected relative to the detector 4b and 4d in the detection devices 4b and 4d in the shown position of the mass, but this changes depending on the position of the mass (see the explanations in respect of FIGS. 4 and 5). If the phase angle of the mass is zero in the stator coordinate system, as shown here, or if the phase angle is 180° (Π) (mass m at 12 o'clock), the standard 3 is deflected to the greatest extent relative to the detectors 4a and 4c, and the position error is at a maximum here, wherein the error at 180° assumes the respective opposite sign of the two detectors 4a and 4c since the standard is deflected precisely in the opposite direction relative to the detector (upward instead of downward, as in the case of the phase angle of zero, in the shown view). As a result of the maximums at zero=>Π=>2Π emerging from the set zero point and detector position in this configuration, the position error may advantageously be described by the cosine function shown above.

In a method for ascertaining an assignment between a torque M which is across, in particular perpendicular to, an axis of rotation D of the rotary apparatus 1, the mass may be a test mass. The mass m may be the mass of a workpiece W in a method for operating a CMM.

4. Ascertaining a Relationship Between Tilting Moment and Deflection; Ascertaining a Tilting Moment from the Relationship.

Figure 9:
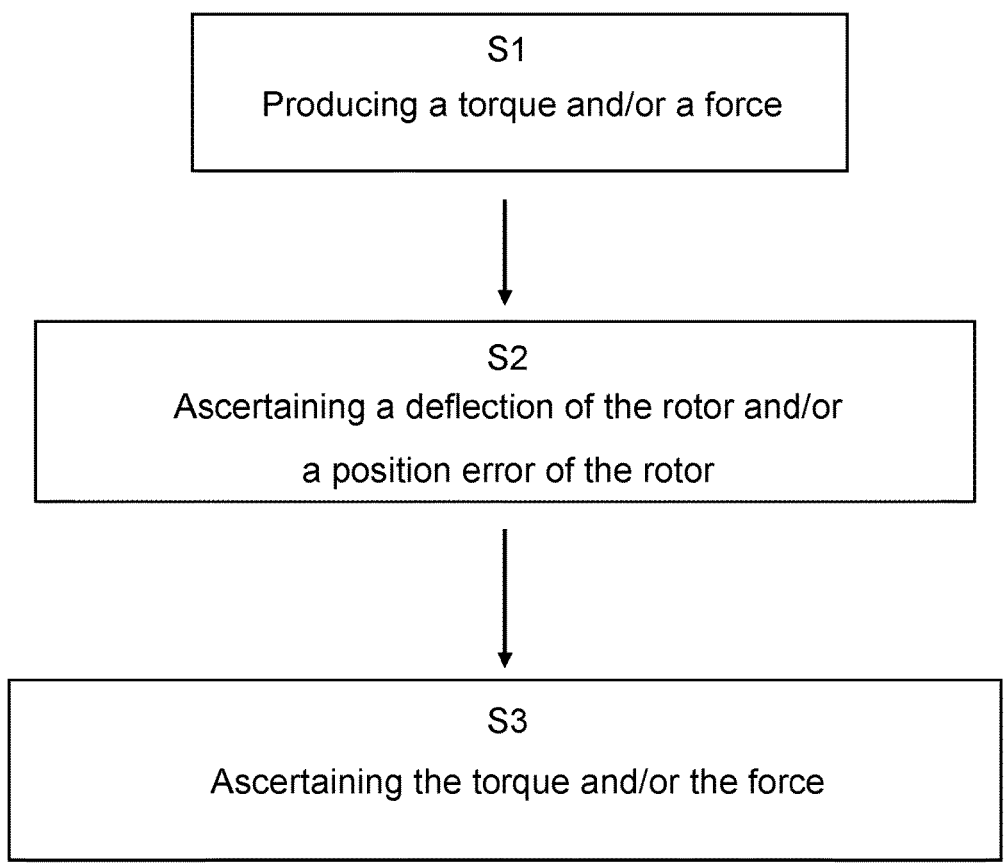
FIG. 9 shows a procedure of a method for ascertaining a torque and/or a force.

Initially, FIG. 9 highlights a procedure of a method for ascertaining a torque and/or a force, which acts on a rotary apparatus and which is directed across an axis of rotation of a rotor of the rotary apparatus. Step S1 is producing a torque and/or a force, which acts on the rotary apparatus and which is directed across the axis of rotation of the rotor of the rotary apparatus. Step S2 is ascertaining a deflection of the rotor and/or a position error of the rotor at a rotational position of the rotor. Step S3 is ascertaining the torque and/or the force at the at least one rotational position of the rotor, using a relationship, known or ascertained for the rotary apparatus, between torque and/or force, and deflection and/or position error.

The amplitude of the fundamental wave produced by the tilting moment may be ascertained as follows:

Assumption: the measuring system (scale) is ideally without errors. By way of example, this may be achieved by a calibration of the rotational position measuring system with a computational correction. Alternatively, the amplitude of the fundamental wave may be detected by one or more known tilting moments for each angle position and corrected by computation. This corresponds to the procedure of FIG. 1, wherein the tilting moments must be introduced from different directions for the data record. An optionally rotational-angle-dependent scaling factor c, by means of which a conversion may be carried out from the amplitude of the eccentric error to the current tilting moment, emerges. The rotational-angle-dependence of the scaling factor is qualified as follows:

The resilience in relation to a tilting moment possibly depends on the rotational position of the rotor. Thus, c is not necessarily constant over the entire considered range of movement. This often applies to rotary tables having an internal three-point bearing. These are usually resilient in a non-uniform manner.

Figure 4:
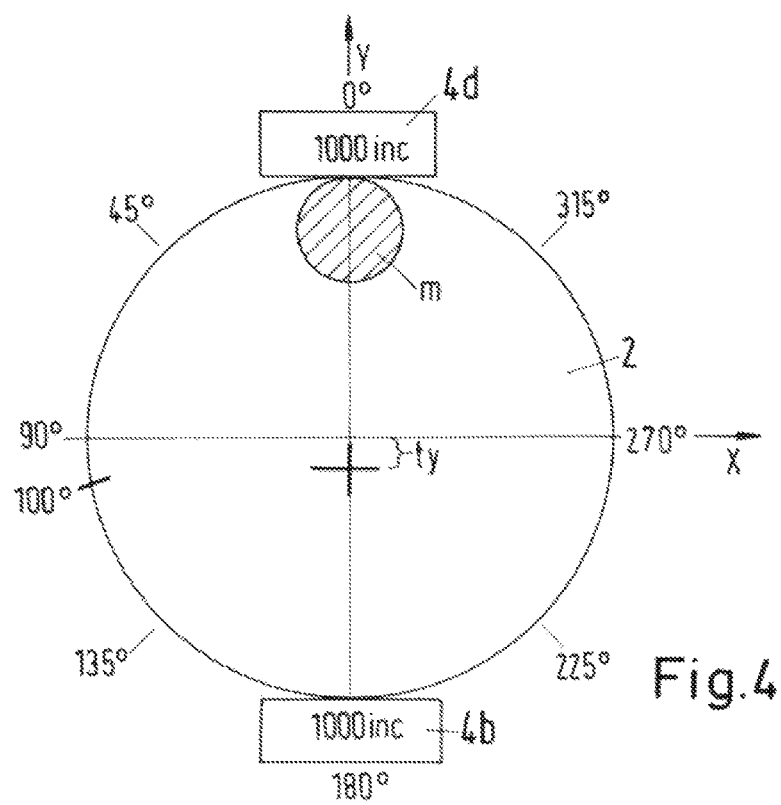
FIG. 4 shows an introduction of weight in the 0° direction in the case of a rotary apparatus with a standard.
Figure 5:
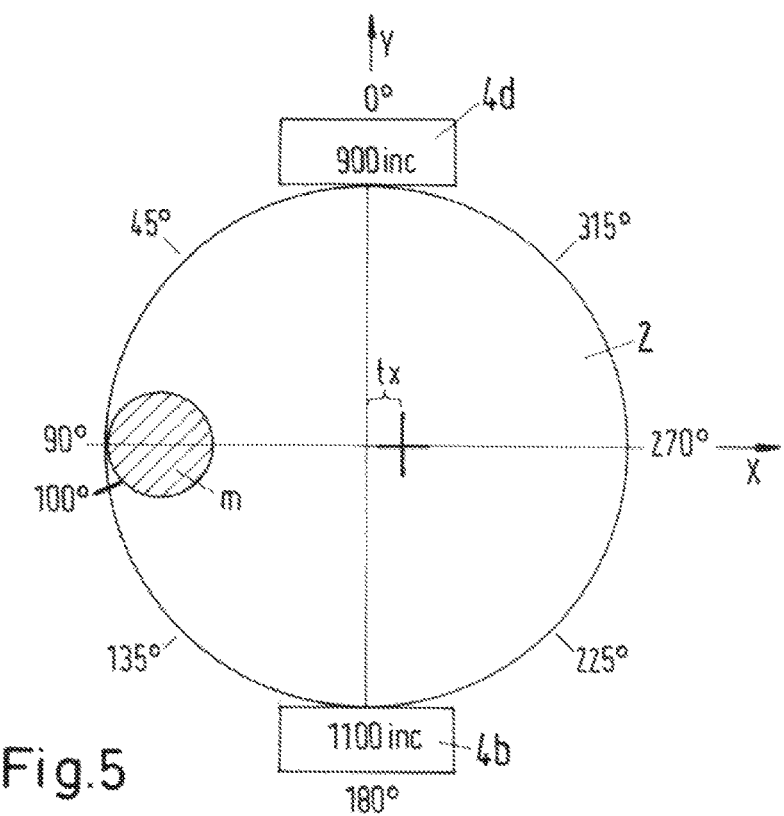
FIG. 5 shows an introduction of weight in the 90° direction in the case of a rotary apparatus with a standard.

The explanations in relation to FIGS. 4 and 5 relate to the production of a torque by a mass and the ascertainment of a deflection of the rotor in accordance with step S1 and S2 of the procedure from FIG. 9. In comparison with FIG. 3, only two of the total of four detection devices are considered in FIGS. 4 and 5 and the setup is depicted schematically therein. FIGS. 4 and 5 consider the pair of detection devices 4b, 4d, wherein the setup is twisted by 180° (4d is at the bottom in FIG. 3 and at the top in FIGS. 4 and 5, at 0° on the angle scale of the stator). The explanations apply in an analogous fashion to a further pair of detection devices 4a, 4c, which is offset in relation to the pair 4b, 4d by 90°, naturally with an appropriately adapted selection of the rotor position and phase position of the mass.

In the following example, the reading heads 4b, 4d of angle measuring systems are considered to be counters. FIGS. 4 and 5 show selected angle values of the angle scale of the stator of the rotary table. The assumption is made that the rotor 2 of the rotary table stands at 100° on this angle scale. The zero mark of the rotor 2 is shown using a thick line at 100°. In the unloaded case, both reading heads 4b, 4b would indicate e.g. 1000 increments (inc).

A tilting moment about the X-axis arises if, as shown in FIG. 4, a weight is introduced by the mass m as a result of an eccentric workpiece mass oriented at 0°. The rotor 2 tilts and this tilt emerges as a deflection or translation ty in the Y-direction in the plane of the angle measuring system. In the case shown in FIG. 4, the displacement of the scale occurs in a non-sensitive direction of the reading heads 4b, 4d. Thus, the displacement is not registered by the reading heads 4b, 4d; both reading heads continue to show 1000 increments (inc) as a position value.

In FIG. 5, the rotor 2 of the rotary table is still situated at the 100° position. The weights as a result of the mass m are now introduced from the 90° direction. As a result of this, a tilting moment arises about the Y-axis. The rotor tilts and this tilt emerges as a translation tx in the X-direction in the plane of the angle measuring system. In FIG. 5, the displacement of the scale occurs in the sensitive direction of the reading heads 4b, 4d. The displacement which is identical in terms of absolute value in FIG. 4 and FIG. 5, tx corresponds to ty in terms of absolute value, is therefore registered in the entirety thereof by the reading heads 4b, 4d. Here, on account of the opposite arrangement, the reading heads 4b, 4d count in the opposite direction such that, for example, the one reading head 4d indicates 900 increments (inc) and the other reading head 4b indicates 1100 increments (inc).

The setups in FIGS. 4 and 5 have a standard which is analogous to the setup in FIG. 3, with the standard being scanned by the detection devices 4b, 4d in FIGS. 4 and 5.

Figure 6:
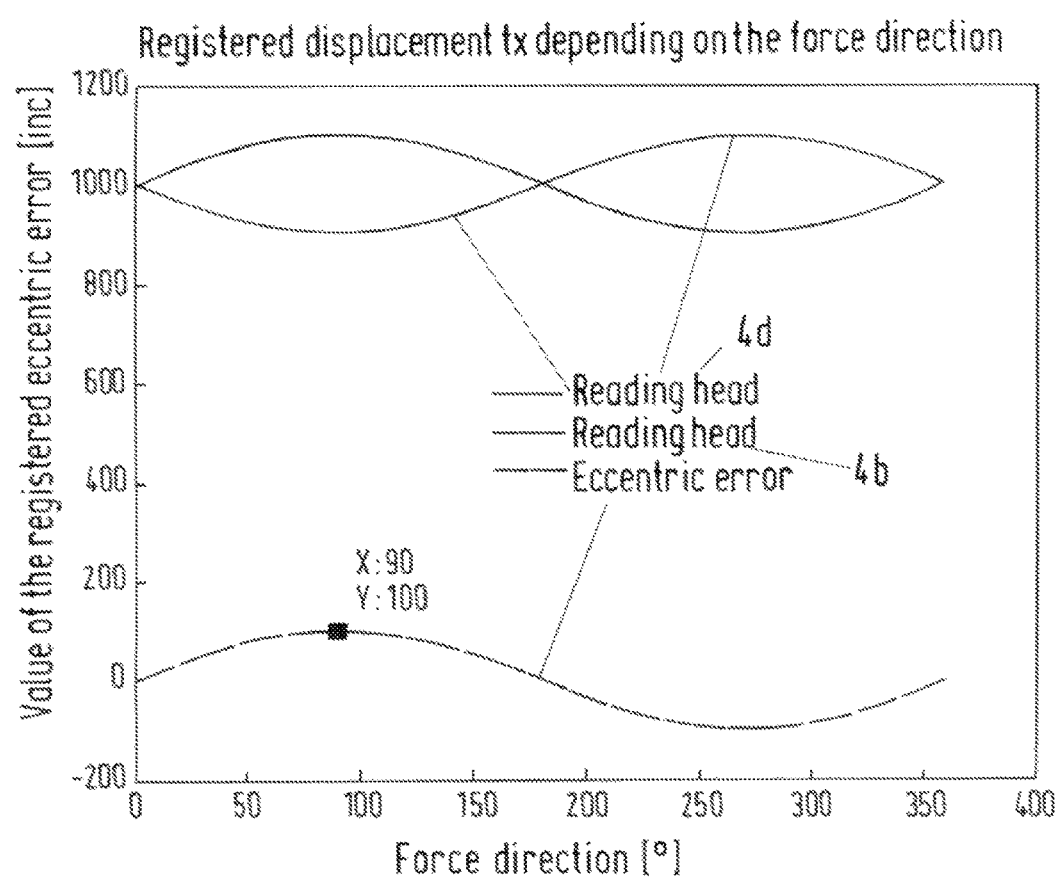
FIG. 6 shows a deflection of the rotor with an applied weight, depending on the rotational angle, measured in increments of the standards.

At the top, FIG. 6 shows the absolute values of the deflection of the rotor 2, measured in increments of the standards for the detection devices 4b, 4d, depending on the direction (angle) of the introduced force.

The lower curve in FIG. 6 shows the resultant deflection after combining the values by calculation. Using the example of the value at 90° from FIG. 5, a value of 900 increments is obtained at detection device 4d and a value of 1100 increments is obtained at detection device 4b, and so the resultant deflection at each detection device is ascertained to be 100.

Absolute value and direction of the torque:

In the case of an isolated treatment of two reading heads lying opposite one another in a pairwise manner, the vector component of the tilting moment in one spatial direction and the sign thereof may be calculated as follows: $M=c*(x2-x1)/2$.

Here, c is a scaling factor between the amplitude of the eccentric error and x1 and x2 are the readings of the two reading heads 4b, 4d.

| Force from direction: | Torque about | Direction of the torque | Direction and sign of the displacement |
| --- | --- | --- | --- |
| 0° | X | − | −ty |
| 90° | Y | − | +tx |
| 180° | X | + | +ty |
| 270° | Y | + | −tx |

*Using 2 reading heads it is only possible to determine the vector component of the displacement in one spatial direction, i.e. of tx or ty. The reading heads need not be oriented along a main direction and need not lie exactly opposite one another either. In any case, it is necessary to know the angle between the reading heads.

Proceeding from the treatment of two reading heads, as described above, use is made of at least three reading heads in the present invention instead of only one or two.

Figure 11:
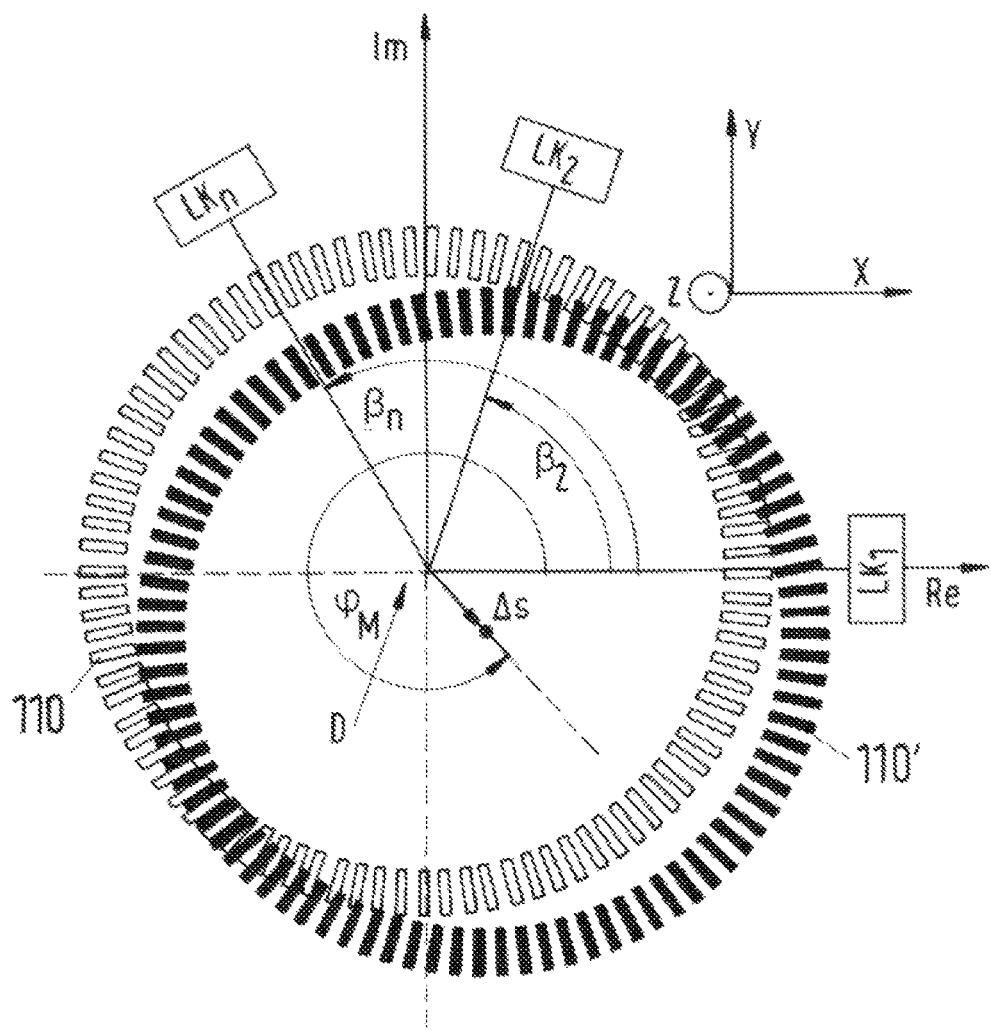
FIG. 11 shows an arrangement of standard and three detection devices.

A variant with four reading heads 4a-d is shown in FIG. 3 and described below. A variant with three reading heads is shown in FIG. 11 and described at the end of this example part.

If four regularly arranged, i.e. 90° offset, reading heads are used, the absolute value of the resultant total torque may be calculated as $$Mv=sqrt(Mx^2+My^2).$$

No rotational movement is required. The tilting moment may be calculated immediately in every position. Thus, the treatment of one rotational position is sufficient and there is no need to set a further rotational position by rotating the rotor. This calculation of the torque corresponds to step S3 of the procedure from FIG. 9.

FIG. 7 shows a rotary apparatus, in which use is made of a measuring body 95 and distance sensors 64a, 94a, 94b, which detect a distance from the measuring body 95, instead of angle sensors or reading heads oriented towards a standard.

Figure 7A:
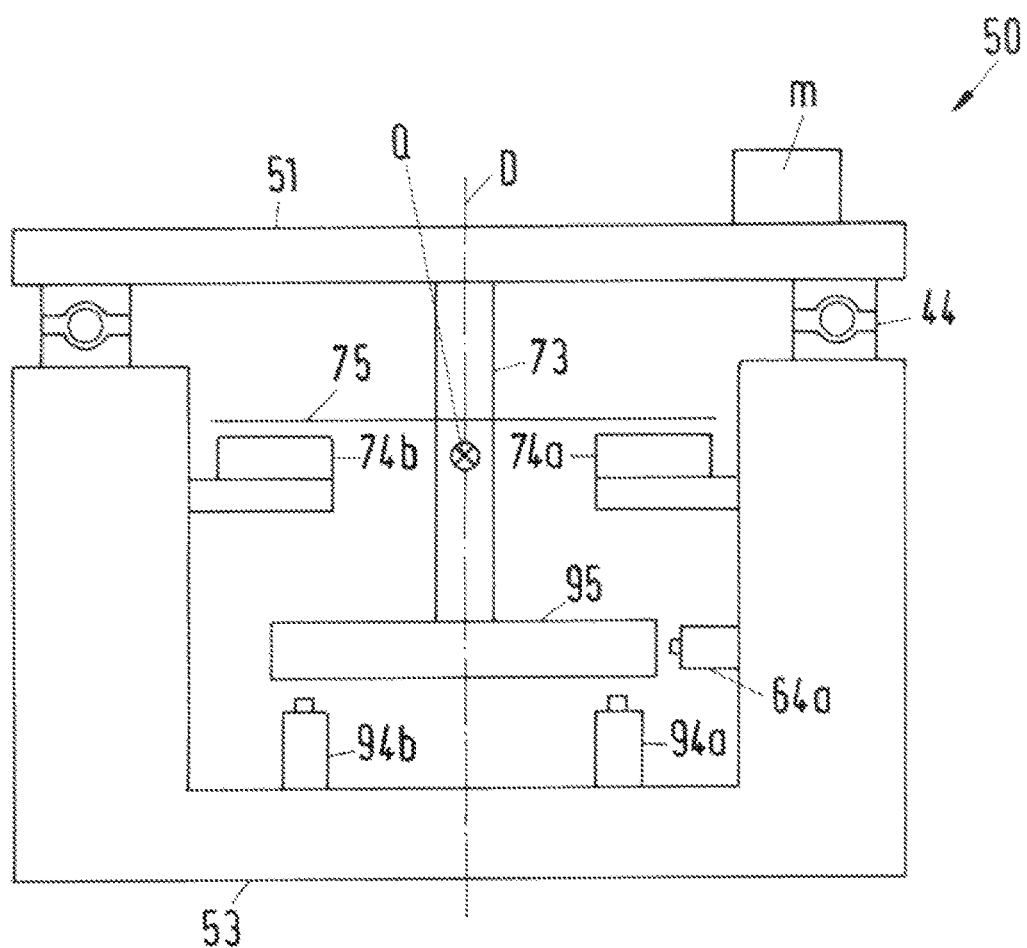
FIGS. 7a and 7b show an alternative embodiment of a rotary apparatus for carrying out a method according to the invention, a rotary apparatus with measuring body and distance sensors.

FIG. 7a shows a combination of two different measuring systems or partial measuring systems in a rotary apparatus. The rotary apparatus 50 comprises a stator 53, a pivot bearing means 44 and a rotor 51.

Measuring body 95, which is a measuring body within the meaning of the present invention, is attached to the rotor by way of a downwardly projecting rod-shaped carrier 73. This measuring body 95 comprises a cylindrical disk, a first sensor 64a for ascertaining the radial relative position between the cylinder disk 95 and the stator 53 being aligned on the external edge of said cylindrical disk extending in the circumferential direction. Further, two sensors 94a, 94b which are aligned in the axial direction, i.e. parallel to the direction of the axis of rotation D, onto a plane surface of the cylinder disk 95 are connected to the stator 53.

A tilting moment onto the rotor 51 is produced if a mass m, for example of a workpiece, the center of gravity of which lies eccentric to the axis of rotation D, is applied. If the center of gravity of the mass m lies e.g. in the plane of the drawing, there is a rotational deflection of the rotor 51 and of the measuring body 95 about a rotational axis which is across the axis of rotation D of the rotor, in this example about the axis Q which is perpendicular to the plane of the drawing. This deflection corresponds to a tilt of the measuring body 95 about the axis Q.

The distance between the sensor 94b and measuring body 95 is reduced as a result of the tilt. The distance between the sensor 94a and measuring body 95 and the distance between the sensor 64a and measuring body 95 are increased.

Figure 7B:
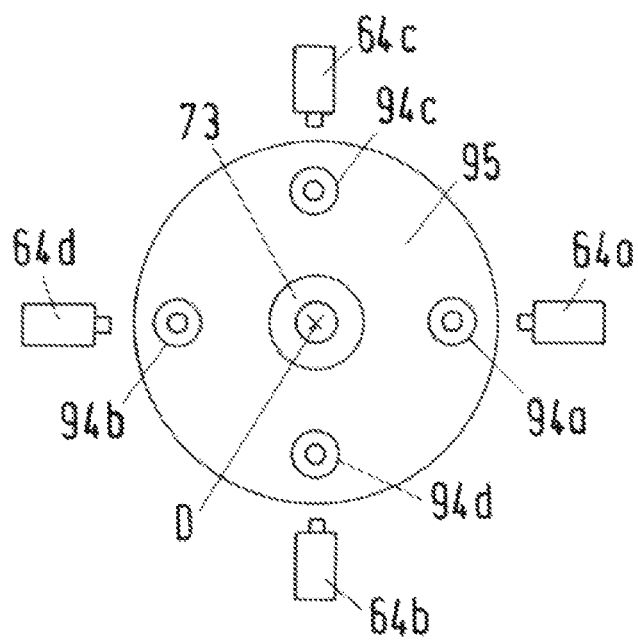

More distance sensors than the three sensors 64a, 94a, 94b shown in an exemplary manner may be present. FIG. 7b shows a view from below onto the measuring body 95 along the axis of rotation D. Further radially aligned sensors 64b, 64c, 64d and further axial sensors 94c and 94d are shown along the external circumference of the measuring body 95.

Further, a rotational position measuring system comprising the standard 75 in the form of a graduated disk and the angle sensors 74a and 74b is shown in the rotary apparatus 50 from FIG. 7a. Here, this rotational position measuring system is not used for the method according to the invention for ascertaining the deflection of the rotor 51, as occurs, for example, using a setup according to FIG. 3 or FIG. 11. Only two angle sensors 74a and 74b are used in this case. However, it would also be possible to provide a third angle sensor or even a fourth angle sensor in order also to use the rotational position measuring system for ascertaining a deflection of the rotor, with redundant systems being present in this case as a measuring body 95 and distance sensors 64 and 94 are also provided.

5. Ascertaining the Phase Angle of the Center of Gravity of a Mass on the Rotor.

Figure 10:
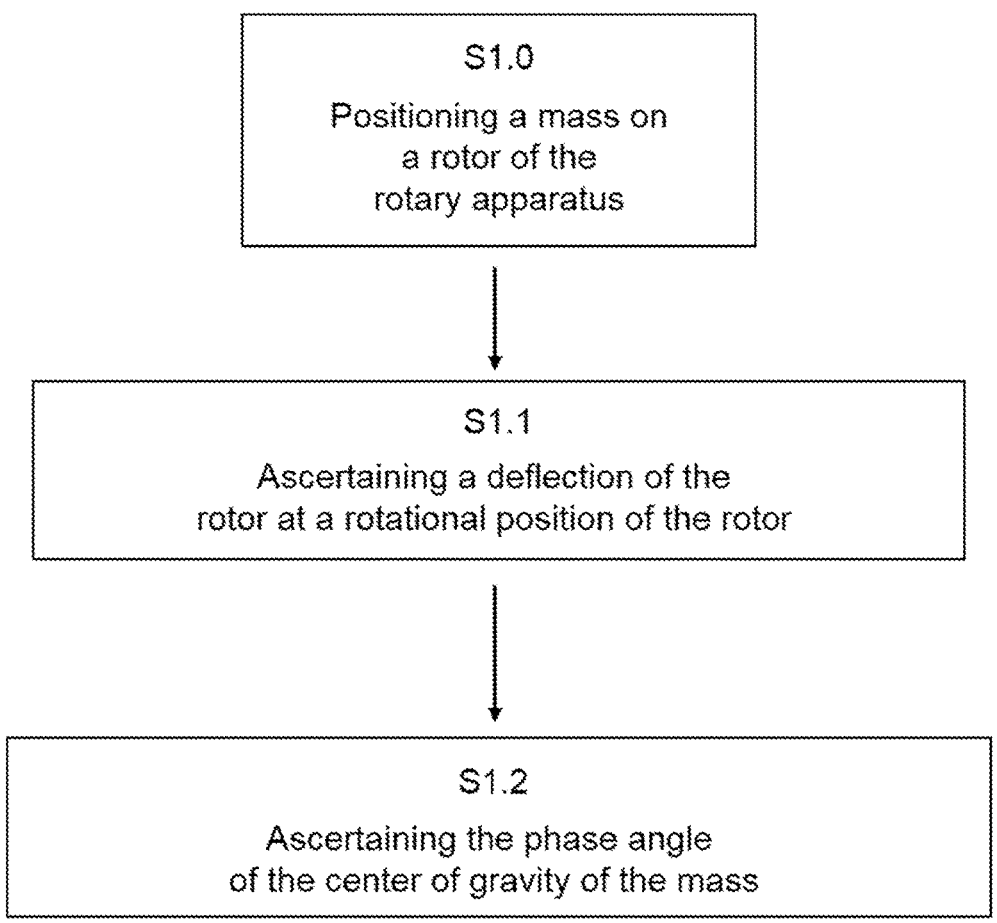
FIG. 10 shows a procedure of a method for ascertaining a phase angle of a center of gravity.

Initially, FIG. 10 shows the procedure of a method for ascertaining the phase angle of the center of gravity of a mass on a rotor of a rotary apparatus in a coordinate system of a stator of the rotary apparatus and/or in a coordinate system of the rotor. Step S1.0 is positioning a mass on a rotor of the rotary apparatus. Step S1.1 is ascertaining a deflection of the rotor at at least one rotational position of the rotor, using a rotational position measuring system of the rotary apparatus comprising a standard and a detection device. Here, the deflection of the rotor is ascertained from the relative position of detection device and standard and/or from the change in the relative position of detection device and standard. Step S1.1 was already explained above on the basis of step S2 from FIG. 9 (see point 4 above in this respect). Step S1.2 is ascertaining the phase angle of the center of gravity of the mass in a coordinate system of a stator of the rotary apparatus and/or in a coordinate system of the rotor from the deflection of the rotor.

Special embodiment variants are described below.

If use is made of four reading heads, the phase of the torque, in step S1.2 of the shown method procedure, may be calculated from the individual torques using $P = a\tan 2(-Mx/My) * 180/pi$.

Figure 8:
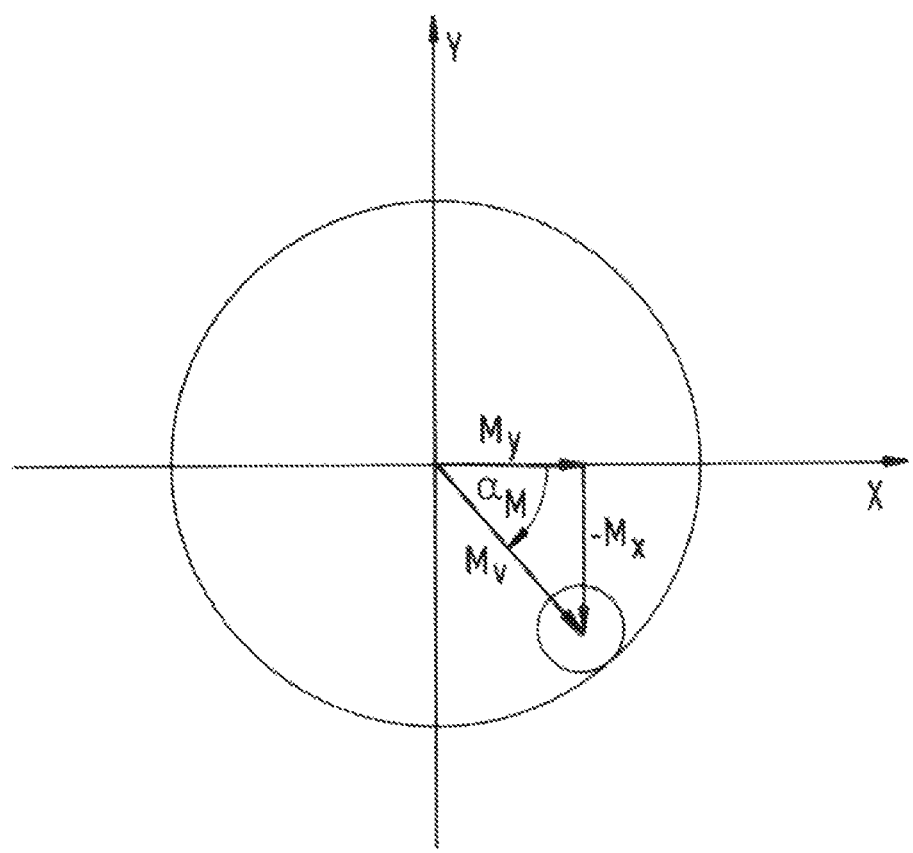
FIG. 8 shows an illustration of the atan2 relationship for determining the phase angle of a mass when four reading heads are used.

Here, the sign of the torque acting in the Y-direction(=the torque about the X-axis) must be rotated in order to arrive at the position of the center of gravity from the torque (see FIG. 8).

If the position of the center of gravity is intended to be specified in the rotor coordinate system, the phase p must still be combined with the rotational angle by calculation.

The following example shows the calculation of the translation of an error-free rotational angle measuring system on the basis of three reading heads.

FIG. 11 shows the setup for this example. A plurality of reading heads LK1, LK2, LKn, but at least the three reading heads shown here, are arranged around an error-free or already calibrated standard 110 at the angles $\beta_1 \ldots \beta_m$ in relation to the global coordinate system. The standard 110 is coupled to the rotor of a rotary apparatus (not shown here) and is stationary, i.e. relatively immovable in relation to the rotor. The provided axis of rotation D of the rotor, and hence the standard 110, is perpendicular to the plane of the drawing and passes through the plane of the drawing where indicated by the arrow proceeding from the reference sign D. The standard 110 is likewise deflected as a result of a deflection of the rotor, to be precise into the position 110'. During the deflection, the standard and the rotor are rotated about an axis which extends parallel to the plane of the drawing (not in the plane of the drawing) and across D.

The deflection which, in principle, is a rotational movement is detected at the reading heads $LK_1$, $LK_2$, $LK_n$ as a translation. The observer of FIG. 11 also sees the movement of the standard 110 into the position 110' in the two-dimensional plane of the drawing as a translation. This detected translation of the standard 110 into the position 110' is described by the absolute value $\Delta s$ and the angle $\varphi_M$ in relation to the global coordinate system, which is plotted top right in FIG. 11.

In the complex plane, depicted in FIG. 11 by the real axis (Re) and the imaginary axis (Im), the movement of the standard may be described by $$M(\varphi) = \Delta s(\varphi) \cdot e^{(j \cdot \varphi_M(\varphi))} \qquad (1)$$

depending on the rotational angle $\varphi$ of the standard. The angle positions of the reading heads in the complex plane may be expressed by the relationship $$E_n = e^{(j \cdot \beta_n)} \qquad (2)$$

The movement $\Delta s$ of the standard results in a different tangential translation component for each reading head. It may be calculated by $$\Delta s_{t,n}(\varphi) = \Im\left(\frac{M}{E_n}\right) = \Im\left(\Delta s(\varphi) \cdot \frac{e^{(j \cdot \varphi_M(\varphi))}}{e^{(j \cdot \beta_n)}}\right) = \qquad (3)$$
$$\Im(\Delta s \cdot e^{(j \cdot (\varphi_M(\varphi) - \beta_n))})$$
$$= \ldots$$
$$= \Delta s \cdot \sin(\varphi_M(\varphi) - \beta_n)$$

for each reading head. As a result of this, the incorrect count of the reading heads resulting from this translation then emerges as $$\gamma_n(\varphi) = \arctan\left(\frac{\Delta s_{t,n}(\varphi)}{R}\right), \quad (4)$$

where R denotes the distance of the measuring point of the reading head from the ideal axis of rotation of the standard. Since $\arctan(x) \approx x$ applies for very small angles, the preceding equation may be rewritten as $$\gamma_n(\varphi) = \frac{\Delta s_{t,n}(\varphi)}{R} = \frac{\Delta s(\varphi) \cdot \sin(\varphi_M(\varphi) - \beta_n)}{R} \quad (5)$$

If all m installed reading heads were referenced to the same reference mark of the calibrated or gradation-fault-free scale, the angle position $\tilde{\varphi}_n$ represented by the n-th reading head is composed of the actual angle rotation $\varphi$ of the standard, the assembly angle βn of the reading head and the incorrect count $\gamma_n$ caused by the translation:

$$\tilde{\varphi}_n = \varphi + \beta_n + \gamma_n \quad (6)$$

The angle difference $\Delta\tilde{\varphi}_{k,l}(\varphi)$, which may be measured between the k-th and l-th reading head, can be calculated by $$\Delta\tilde{\varphi}_{k,l}(\varphi) = \tilde{\varphi}_k - \tilde{\varphi}_l = \varphi + \beta_k - \beta_l + \gamma_k(\varphi) - \gamma_l(\varphi)\ \text{for}\ k \neq l. \quad (7)$$

Since the angle positions $\beta_1 \ldots \beta_m$ are known, the differences $\beta_k - \beta_l$ thereof are also known. Therefore, the measured angle difference $\Delta\tilde{\varphi}_{k,l}(\varphi)$ may be rewritten into an offset-corrected angle difference $\Delta\varphi_{k,l}(\varphi)$ as $$\Delta\varphi_{k,l}(\varphi) = \Delta\tilde{\varphi}_{k,l}(\varphi) - (\beta_k - \beta_l) = \gamma_k(\varphi) - \gamma_l(\varphi)\ \text{for}\ k \neq l. \quad (8)$$

If $\gamma_k$ and $\gamma_l$ in equation (8) are now replaced by the values of equation (5), the offset-corrected angle differences $\Delta\varphi_{k,l}$ emerge as $$\Delta\varphi_{k,l}(\varphi) = \frac{\Delta s(\varphi) \cdot \sin(\varphi_M(\varphi) - \beta_k)}{R} - \frac{\Delta s(\varphi) \cdot \sin(\varphi_M(\varphi) - \beta_l)}{R} \quad (9)$$
$$= \frac{\Delta s(\varphi)}{R} \cdot (\sin(\varphi_M(\varphi) - \beta_k) - \sin(\varphi_M(\varphi) - \beta_l))$$

Using the addition theorems $\sin(x \pm y) = \sin x \cos y \pm \sin y \cos x$ of the trigonometric functions, equation (9) emerges as $$\Delta\varphi_{k,l}(\varphi) = \frac{\Delta s(\varphi)}{R} \cdot \frac{\overbrace{(\sin(\varphi_M(\varphi)) \cdot \cos(\beta_k) -}^{\sin(\varphi_M(\varphi) - \beta_k)}}{\sin(\beta_k) \cdot \cos(\varphi_M(\varphi))} \quad (10)$$
$$\frac{-\sin(\varphi_M(\varphi) - \beta_l)}{-\sin(\varphi_M(\varphi)) \cdot \cos(\beta_l) +}$$
$$\sin(\beta_l) \cdot \cos(\varphi_M(\varphi)))$$
$$= \frac{\Delta s(\varphi)}{R} \cdot (\sin(\varphi_M(\varphi)) \cdot \cos(\beta_k - \cos\beta_l) +$$
$$\cos(\varphi_M(\varphi)) \cdot \sin(\beta_l - \sin\beta_k))$$

In end effect, equation (10) only consists of two unknowns: $\Delta s(\varphi)$ and $\varphi_M(\varphi)$. $\Delta\varphi_{k,l}(\varphi)$ is known from the measurement (difference measurement of the reading head signals) and $\beta_1 \ldots \beta_m$ are known by forming an average (see Geckeler's equation (7)). It is also clear from equation (10) that the translation cannot be calculated uniquely using only two reading heads. However, if m≥3 reading heads are installed on the standard, $$\Sigma_{i=1}^{m-1} m$$

possible instances of forming the difference emerge according to equations (7) and (8) and hence also correspondingly many different equations according to formula (10). Hence, the system of equations is uniquely solvable for each rotational angle $\varphi$.

Calculation example.

The translation back calculation for a specific rotational angle $\varphi$ should be shown below on the basis of an example.
Given:
  Translation: $\varphi M = 45°$, $\Delta s = 0.00001$ m
  three reading heads: $\beta_1 = 0°$, $\beta_2 = 74°$, and $\beta_3 = 132.85°$
  $R = 0.075$ m
Measured angle differences
  $\Delta\varphi_{2,1} = -1.5892 \cdot 10^{-4}$
  $\Delta\varphi_{3,1} = -2.2752 \cdot 10^{-4}$
  $\Delta\varphi_{3,2} = -6.859 \cdot 10^{-5}$
Calculated differences of the angle values:
  $K_{2,1} := \cos\beta_2 - \cos\beta_1 = -0.724$
  $K_{3,1} := \cos\beta_3 - \cos\beta_1 = -1.6801$
  $K_{3,2} := \cos\beta_3 - \cos\beta_2 = -0.9552$
  $S_{2,1} := \sin\beta_1 - \sin\beta_2 = -0.9613$
  $S_{3,1} := \sin\beta_1 - \sin\beta_3 = -0.7331$
  $S_{3,2} := \sin\beta_2 - \sin\beta_3 = 0.2281$ Initially, equation (10) is rewritten for $\Delta s$ for the cases k=2 and l=1, and k=3 and l=1, and these cases are equated:

$$\frac{\Delta\varphi_{2,1} \cdot R}{\sin(\varphi_{M,rueck}) \cdot K_{2,1} + \cos(\varphi_{M,rueck}) \cdot S_{2,1}} = \quad (11)$$
$$\frac{\Delta\varphi_{3,1} \cdot R}{\sin(\varphi_{M,rueck}) \cdot K_{3,1} + \cos(\varphi_{M,rueck}) \cdot S_{3,1}}$$

$$\Delta\varphi_{2,1} \cdot (\sin(\varphi_{M,rueck}) \cdot K_{3,1} + \cos(\varphi_{M,rueck}) \cdot S_{3,1}) =$$
$$\Delta\varphi_{3,1} \cdot (\sin(\varphi_{M,rueck}) \cdot K_{2,1} + \cos(\varphi_{M,rueck}) \cdot S_{2,1})$$

$$\Delta\varphi_{2,1} \cdot \sin(\varphi_{M,rueck}) \cdot K_{3,1} + \Delta\varphi_{2,1} \cdot \cos(\varphi_{M,rueck}) \cdot S_{3,1} =$$
$$\Delta\varphi_{3,1} \cdot \sin(\varphi_{M,rueck}) \cdot K_{2,1} + \Delta\varphi_{3,1} \cdot \cos(\varphi_{M,rueck}) \cdot S_{2,1}$$

$$\sin(\varphi_{M,rueck}) \cdot (\Delta\varphi_{2,1} \cdot K_{3,1} - \Delta\varphi_{3,1} \cdot K_{2,1}) =$$
$$\cos(\varphi_{M,rueck}) \cdot (\Delta\varphi_{3,1} \cdot S_{2,1} - \Delta\varphi_{2,1} \cdot S_{3,1})$$

$$\frac{\sin(\varphi_{M,rueck})}{\cos(\varphi_{M,rueck})} = \tan(\varphi_{M,rueck}) = \frac{\Delta\varphi_{3,1} \cdot S_{2,1} - \Delta\varphi_{2,1} \cdot S_{3,1}}{\Delta\varphi_{2,1} \cdot K_{3,1} - \Delta\varphi_{3,1} \cdot K_{2,1}}$$

$$\Rightarrow \varphi_{M,rueck} = \arctan\left(\frac{\Delta\varphi_{3,1} \cdot S_{2,1} - \Delta\varphi_{2,1} \cdot S_{3,1}}{\Delta\varphi_{2,1} \cdot K_{3,1} - \Delta\varphi_{3,1} \cdot K_{2,1}}\right)$$

The aforementioned values are inserted into equation (11):

$$\varphi_{M,rueck} = \arctan\left(\frac{\begin{pmatrix}(-2.2752 \cdot 10^{-4} \cdot -0.9613) - \\ (1.5892 \cdot 10^{-4} \cdot -0.7331)\end{pmatrix}}{\begin{pmatrix}(-1.5892 \cdot 10^{-4} \cdot -1.6801) - \\ (2.2752 \cdot 10^{-4} \cdot -0.724)\end{pmatrix}}\right) \quad (12)$$

$$\varphi_{M,rueck} = \arctan(1) = \frac{\pi}{4} \stackrel{\wedge}{=} 45°$$

Then, the angle $\varphi_{M,rueck}$ obtained thus may be inserted into equation (10) for either k=2 and l=1 or k=3 and l=1. Hence, the absolute value of the translation $\Delta s$ emerges as $$\Delta s_{rueck} = \frac{\Delta \varphi_{3,1} \cdot R}{\sin(\varphi_{M,rueck}) \cdot K_{3,1} + \cos(\varphi_{M,rueck}) \cdot S_{3,1}} \quad (13)$$

$$= \frac{-2.2752 \cdot 10^{-4} \cdot 0.075 \text{ m}}{\sin\left(\frac{\pi}{4}\right) \cdot -16801 + \cos\left(\frac{\pi}{4}\right) \cdot -0.7331}$$

$$= 0.00001 \text{ m}$$

It was possible to back calculate the translation in terms of absolute value and phase; the result corresponds to the predetermined values.

The more reading heads are able to be used during the back calculation, the more accurate the calculation should be in relation to influences such as noise in that case, since the back calculation may be carried out using a number of formulae. Here, the translation was only back calculated from an ideal signal.

The invention claimed is:

1. A method for ascertaining a torque and/or a force, which acts on a rotary apparatus of a coordinate measuring machine and which is directed across an axis of rotation of a rotor of the rotary apparatus, wherein the rotary apparatus comprises a measuring system, the latter comprising:
    a measuring body; and
    at least three detection devices for detecting a relative position of the detection devices in relation to the measuring body and/or for detecting a change in the relative position of the detection devices in relation to the measuring body;
and wherein the method comprises the following steps:
    producing a torque and/or a force, which acts on the rotary apparatus and which is directed across the axis of rotation of the rotor of the rotary apparatus, in a set rotational position, wherein the torque and/or the force brings about a deflection of the rotor;
    ascertaining the deflection of the rotor and/or a position error of the rotor in the one set rotational position of the rotor, from the relative position of the at least three detection devices and of the measuring body; and
    ascertaining a value of the torque and/or the force at the one set rotational position of the rotor using a relationship, which is known or ascertained for the rotary apparatus and which is an assignment or a functional relationship, between
    i) torque and/or force, and
    ii) deflection and/or position error.

2. The method as claimed in claim 1, wherein the at least three detection devices comprise four detection devices.

3. The method as claimed in claim 2, wherein the four detection devices are arranged distributed about the axis of rotation, offset from one another by 80-110°.

4. The method as claimed in claim 1, wherein the torque is produced by:
    positioning a mass on the rotor, wherein the center of gravity of the mass is eccentric in relation to the axis of rotation, and/or
    exerting a force on the rotor by contacting the rotor or a workpiece positioned on the rotor with a measuring system of the coordinate measuring machine.

5. The method as claimed in claim 1, wherein the method is used to ascertain a positioning of a mass on the rotor in which the torque and/or the force is substantially zero, wherein the mass is positioned on the rotor in the method in such a way that the deflection and/or the ascertained position error is substantially zero.

6. The method as claimed in claim 1, further including the step of outputting a warning and/or preventing a rotational movement of the rotor if a predetermined threshold of the torque and/or of the force is reached or exceeded.

7. The method as claimed in claim 1, wherein the relationship is obtained by:
    a) producing at least one torque and/or at least one force, which is directed across the axis of rotation of the rotor of the rotary apparatus, at at least one rotational position of the rotor;
    b) ascertaining a deflection and/or a position error of the rotary apparatus, which is caused by the at least one torque and/or the at least one force, at the at least one rotational position; and
    c) ascertaining a relationship between (i) torque and/or force and (ii) deflection and/or position error.

8. The method as claimed in claim 1, further comprising the steps of:
    ascertaining a phase angle of the center of gravity of a mass positioned on the rotor in a coordinate system of a stator of the rotary apparatus and/or in a coordinate system of the rotor from the deflection of the rotor or the position error of the rotor.

9. The method as claimed in claim 8, further comprising the steps of:
    ascertaining a deflection of the rotor in a first spatial direction and a deflection of the rotor in a second spatial direction, at a rotational position of the rotor, and
    ascertaining the phase angle of the center of gravity of the mass from the deflection in the first spatial direction and the deflection in the second spatial direction.

* * * * *